US008090102B2

(12) United States Patent
Kitaya et al.

(10) Patent No.: US 8,090,102 B2
(45) Date of Patent: Jan. 3, 2012

(54) INFORMATION PROCESSING DEVICE, INFORMATION PROCESSING METHOD, AND COMPUTER PROGRAM

(75) Inventors: Yoshimichi Kitaya, Kanagawa (JP); Shinobu Kuriya, Kanagawa (JP)

(73) Assignee: Sony Corporation, Tokyo (JP)

( * ) Notice: Subject to any disclaimer, the term of this patent is extended or adjusted under 35 U.S.C. 154(b) by 1042 days.

(21) Appl. No.: 10/490,232

(22) PCT Filed: Jun. 30, 2003

(86) PCT No.: PCT/JP03/08267

§ 371 (c)(1), (2), (4) Date: Mar. 19, 2004

(87) PCT Pub. No.: WO2004/010307

PCT Pub. Date: Jan. 29, 2004

(65) Prior Publication Data

US 2004/0255135 A1 Dec. 16, 2004

(30) Foreign Application Priority Data

Jul. 23, 2002 (JP) ................................ 2002-213700

(51) Int. Cl.
*H04N 7/167* (2006.01)
*H04N 1/00* (2006.01)
*G06F 7/04* (2006.01)

(52) U.S. Cl. ............................ 380/201; 380/255; 726/5

(58) Field of Classification Search .................... 726/27
See application file for complete search history.

(56) References Cited

U.S. PATENT DOCUMENTS 5,634,012 A 5/1997 Stefik et al.
5,903,650 A * 5/1999 Ross et al. ...................... 705/59
5,982,891 A 11/1999 Ginter et al.
6,020,883 A * 2/2000 Herz et al. .................... 715/721
6,385,596 B1 * 5/2002 Wiser et al. ..................... 705/51
6,727,914 B1 * 4/2004 Gutta ........................... 715/719
6,873,975 B1 3/2005 Hatakeyama et al.
6,993,508 B1 * 1/2006 Major et al. .................... 705/51
2002/0108114 A1 * 8/2002 Shinohara et al. ............. 725/46
(Continued)

FOREIGN PATENT DOCUMENTS

JP 7-221751 8/1995
(Continued)

OTHER PUBLICATIONS

European Search Report mailed by the European Patent Office on Oct. 12, 2007 for counterpart Application No. 03738574.7.

*Primary Examiner* — Nasser Moazzami
*Assistant Examiner* — Daniel Hoang
(74) *Attorney, Agent, or Firm* — Finnegan, Henderson, Farabow, Garrett & Dunner, L.L.P.

(57) ABSTRACT

To provide an apparatus and method for realizing an improved content preview process in a content using mechanism based on content usage-right information. A client obtains default usage-right information (Default Usage Right) when it is registered to a license server, and determines, based on the default usage-right information, whether or not the content can be played back in a content preview process without purchasing the content. The client which is permitted to preview the content is limited to a client which has been registered to the license server to obtain the default usage-right information. This prevents preview-data from being randomly distributed.

10 Claims, 34 Drawing Sheets

U.S. PATENT DOCUMENTS

2002/0170053 A1* 11/2002 Peterka et al. .................. 725/31

FOREIGN PATENT DOCUMENTS

| | | |
|---|---|---|
| JP | 07-221751 | 8/1995 |
| JP | 8-272746 | 10/1996 |
| JP | 9-297682 | 11/1997 |
| JP | 09-297682 | 11/1997 |
| JP | 2000-293439 | 10/2000 |
| JP | 2002-133147 | 5/2002 |
| WO | WO 01/44907 | 6/2001 |

* cited by examiner

KR
K0
K1
K00
K01
K10
K11
K000
K001
K010
K011
K100
K101
K110
K111
K0000
K0001
K0010
K0011
K0100
K0101
K0110
K0111
K1000
K1001
K1010
K1011
K1100
K1101
K1110
K1111
0 1 2 3 4 5 6 7 8 9 10 11 12 13 14 15
DEVICE (A) ENABLING KEY BLOCK (EKB) EXAMPLE 1

NODE KEYS AT VERSION t ARE SENT TO DEVICES 0, 1, AND 2

| VERSION: t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

(B) ENABLING KEY BLOCK (EKB) EXAMPLE 2

NODE KEYS AT VERSION t ARE SENT TO DEVICES 0, 1, AND 2

| VERSION: t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG. 4

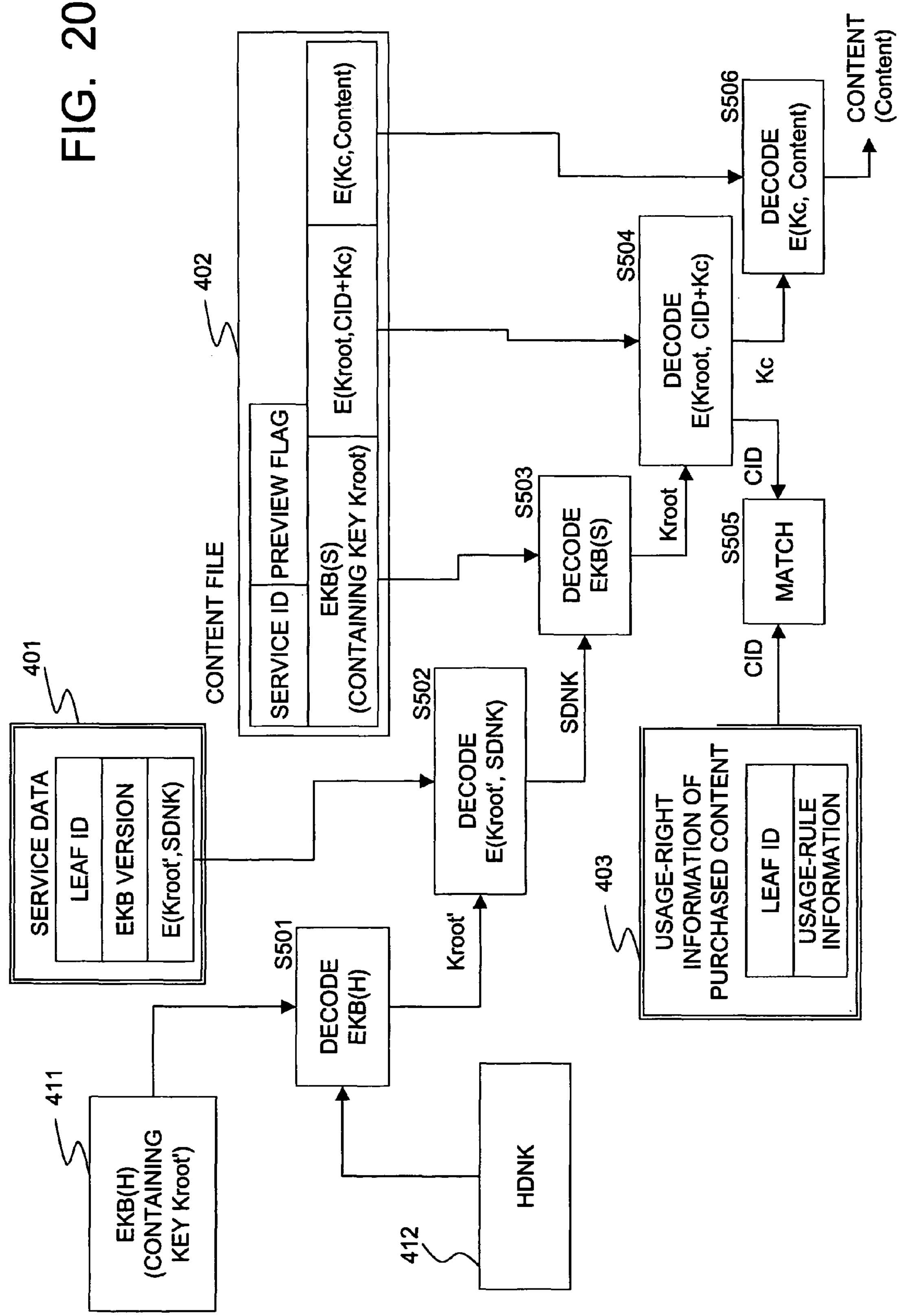
FIG. 20
402
CONTENT FILE
SERVICE ID
PREVIEW FLAG
EKB(S) (CONTAINING KEY Kroot)
E(Kroot,CID+Kc)
E(Kc,Content)
401
SERVICE DATA
LEAF ID
EKB VERSION
E(Kroot',SDNK)
411
EKB(H) (CONTAINING KEY Kroot')
412
HDNK
S501
DECODE EKB(H)
Kroot'
S502
DECODE E(Kroot', SDNK)
SDNK
S503
DECODE EKB(S)
Kroot
S504
DECODE E(Kroot, CID+Kc)
Kc
CID
S505
MATCH
CID
S506
DECODE E(Kc, Content)
CONTENT (Content)
403
USAGE-RIGHT INFORMATION OF PURCHASED CONTENT
LEAF ID
USAGE-RULE INFORMATION

INFORMATION PROCESSING DEVICE, INFORMATION PROCESSING METHOD, AND COMPUTER PROGRAM

TECHNICAL FIELD

The present invention relates to an information processing apparatus, an information processing method, and a computer program. In particular, the present invention relates to an information processing apparatus, an information processing method, and a computer program which realize content usage-right checking when content is used, such as when content is played back, and which allow for audio and visual preview of the content so as to provide users with flexible content use experiences.

BACKGROUND ART

Recently, distribution of various software data, such as music data, game programs, image data (such data is hereinafter referred to as content), via networks, such as the Internet, or distributable storage media, such as memory cards, HDs, DVDs, and CDs, has become popular. The distributed content is played back once it is stored in an internal storage unit, e.g., an HD, of a user's PC (Personal Computer), recording/playback device, playback-only device, or game devices, a card-type storage device having a flash memory, a CD, a DVD, etc.

An information device, such as a recording/playback device, a game device, and a PC, has an interface through which content is received over a network or an interface through which the device accesses a memory card, an HD, a DVD, a CD, etc., a controller necessary for playback of the content, a RAM used as a memory area for a program and data, a ROM, and so on.

Various content, such as music data, image data, or a program, is invoked by a user instruction from an information device itself, such as a recording/playback device used as a playback device, a game device, or a PC, or a user instruction using a connected input unit so as to be retrieved from, for example, a built-in or removable storage medium. The content is played back by the information device or via a display, speaker, etc., connected thereto.

In general, authors or sellers of many types of software content, such as game programs, music data, and image data, hold the distribution rights thereof or the like. In distributing the content, therefore, security measures are usually taken against unauthorized duplication by providing certain usage limitations, that is, by permitting only the authorized user to use the software.

A mechanism in which content and a usage right for using the content are managed independently and are offered to a user has been proposed. In this mechanism, for example, the user must obtain encrypted content and purchase usage-right data thereof to obtain a key (content key) for decoding the encrypted content based on key data or the like, which can be obtained from the usage-right data, in order to use the content.

The usage-right data contains setting information indicating the manner that the user can use the content, so that the user can use the content within the range permitted by the permission information. Such a system has been proposed.

DISCLOSURE OF INVENTION

Accordingly, in the system in which content and a content usage right are independently managed and are offered to users, the usage-right data must be checked when the content is used, for example, when music data or image data is played back, distributed, or downloaded.

In this mechanism, if it is determined that a user is not authorized to use the content as a result of the usage-right checking, the content cannot be played back, distributed, or downloaded.

However, actually, there exists a demand for audio or visual preview of a portion of the content, before the content is purchased, in order to demonstrate the content before purchasing. In such a case, because it is determined in a standard content usage-right checking process that the usage right is absent, playback or the like of the content will be rejected.

In order to overcome such a drawback, it is conceivable that free sample data, which does not consider usage rights, is distributed to users. However, most content has copyright and distribution rights maintained by its author and distributor, respectively, and therefore it is undesirable that the content, even a portion of the content, be randomly distributed and be copied from one user to another without authorization.

The present invention has been made in view of such a background. It is an object of the present invention to provide an information processing apparatus, an information processing method, and a computer program which allow a user who purchases authorized content to use the authorized content based on usage rights and to audibly or visually preview the content without purchasing the content.

It is another object of the present invention to provide an information processing apparatus, an information processing method, and a computer program which can prevent random secondary distribution of audio or visual preview-data.

In a first aspect, the present invention provides an information processing apparatus for controlling decoding and using of encrypted content, the information processing apparatus including:

control means for controlling content use based on usage-right information corresponding to the content according to an instruction to use the content; and recording means for recording default usage-right information, the default usage-right information being recorded in manufacturing or being obtained at a service registration time, wherein the control means permits the content to be decoded and used based on the description of the default usage-right information when the content includes information indicating association with the default usage-right information.

In an embodiment of the information processing apparatus of the present invention, the content which is permitted for use based on the default usage-right information is provided for the purpose of sampling, and the control means determines whether or not the content includes a flag indicating sample content, and permits playback of the content according to a determination result.

In another embodiment of the information processing apparatus of the present invention, the information processing apparatus further includes sending means for sending a service registration request, and receiving means for receiving the default usage-right information sent from a license server in response to the registration request.

In another embodiment of the information processing apparatus of the present invention, the receiving means further receives key information necessary for decoding the content.

In a second aspect, the present invention provides an information processing apparatus for issuing a usage right having usage rules of encrypted content, the information processing apparatus including:

receiving means for receiving a registration request; and sending means for sending key information and default usage-right information in response to the registration request, the key information being necessary for decoding the encrypted content.

In an embodiment of the information processing apparatus of the present invention, the content which is permitted for use based on the default usage-right information is provided for the purpose of sampling, and the default usage-right information includes a description indicating that playback of the content is permitted when the content includes a flag indicating sample content.

In a third aspect, the present invention provides an information processing method for controlling decoding and using of encrypted content, the information processing method including a control step of controlling content use based on usage-right information corresponding to the content according to an instruction to use the content, wherein the control step includes:

a step of determining whether or not the content includes information indicating association with default usage-right information recorded in manufacturing or default usage-right information obtained at a service registration time; and a step of permitting the content to be decoded and used based on the description of the default usage-right information when the content includes the information indicating association with the default usage-right information.

In an embodiment of the information processing method of the present invention, the content which is permitted for use based on the default usage-right information is provided for the purpose of sampling, and the control step further includes a step of determining whether or not the content includes a flag indicating sample content, and permitting playback of the content according to a determination result.

In another embodiment of the information processing method of the present invention, the information processing method further includes a sending step of sending a service registration request, and a receiving step of receiving the default usage-right information sent from a license server in response to the registration request.

In another embodiment of the information processing method of the present invention, the information processing method further includes a step of receiving key information necessary for decoding the content.

In a fourth aspect, the present invention provides an information processing method for issuing a usage right having usage rules of encrypted content, the information processing method including:

a receiving step of receiving a registration request; and a sending step of sending key information and default usage-right information in response to the registration request, the key information being necessary for decoding the encrypted content.

In an embodiment of the information processing method of the present invention, the content which is permitted for use based on the default usage-right information is provided for the purpose of sampling, and the default usage-right information includes a description indicating that playback of the content is permitted when the content includes a flag indicating sample content.

In a fifth aspect, the present invention provides a computer program for performing an information process for controlling decoding and using of encrypted content, the computer program including a control step of controlling content use based on usage-right information corresponding to the content according to an instruction to use the content, wherein the control step includes:

a step of determining whether or not the content includes information indicating association with default usage-right information recorded in manufacturing or default usage-right information obtained at a service registration time; and a step of permitting the content to be decoded and used based on the description of the default usage-right information when the content includes the information indicating association with the default usage-right information.

In an embodiment of the computer program of the present invention, the content which is permitted for use based on the default usage-right information is provide for the purpose of sampling, and the control step further includes a step of determining whether or not the content includes a flag indicating sample content, and permitting playback of the content according to a determination result.

In another embodiment of the computer program of the present invention, the computer program further includes a sending step of sending a service registration request, and a receiving step of receiving the default usage-right information sent from a license server in response to the registration request.

In another embodiment of the computer program of the present invention, the computer program further includes a step of receiving key information necessary for decoding the content.

In a sixth aspect, the present invention provides a computer program for performing an information process for issuing a usage right having usage rules of encrypted content, the computer program including:

a receiving step of receiving a registration request;

a sending step of sending key information and default usage-right information in response to the registration request, the key information being necessary for decoding the encrypted content.

In an embodiment of the computer program of the present invention, the content which is permitted for use based on the default usage-right information is provided for the purpose of sampling, and the default usage-right information includes a description indicating that playback of the content is permitted when the content includes a flag indicating sample content.

In a seventh aspect, the present invention provides a content usage management system including a content using apparatus for decoding and using encrypted content, and a usage-right issuing apparatus for issuing a usage right having usage rules of the encrypted content, wherein the content using apparatus includes:

sending means for sending a service registration request; and receiving means for receiving default usage-right information sent from a license server in response to the registration request, and the usage-right issuing apparatus includes:

receiving means for receiving the registration request; and sending means for sending key information and the default usage-right information in response to the registration request, the key information being necessary for decoding the encrypted content.

In an eighth aspect, the present invention provides a content usage managing method for a content usage management system including a content using apparatus for decoding and using encrypted content, and a usage-right issuing apparatus for issuing a usage right having usage rules of the encrypted content, the content usage managing method including:

a registration-request sending step of sending a service registration request from the content using apparatus to the usage-right issuing apparatus;

a data sending step of, in the usage-right issuing apparatus, receiving the registration request and sending key information and default usage-right information in response to the registration request, the key information being necessary for decoding the encrypted content; and a receiving step of, in the content using apparatus, receiving the default usage-right information.

According to the structure of the present invention, a client obtains default usage-right information (Default Usage Right) when it is registered to a license server, and is permitted to play back the content based on the default usage-right information in a content preview process without purchasing the content. Therefore, the user is able to preview and play back the content without purchasing the content. The client which is permitted to preview the content is limited to a client which has been registered to the license server to obtain the default usage-right information. This prevents preview-data from being randomly distributed.

According to the structure of the present invention, furthermore, also in the content preview process without purchasing the content, only the user having authorized DNKs for a hardware EKB [EKB(H)] serving as an EKB corresponding to a category tree established for hardware devices, which are content-using devices, and a service EKB [EKB(S)] serving as an EKB corresponding to a category tree established for content-using services can play back the content and preview the content with limited playback control.

The computer program of the present invention is a computer program which can be offered in the computer-readable form to, for example, a general-purpose computer system capable of executing various program code by means of storage media or communication media, for example, storage media such as CDs, FDs, and MOs, or communication media such as a network. Such a computer-readable program is offered, so that the process according to the program can be performed on a computer system.

Other objects, features, and advantages of the present invention will become apparent from the following detailed description of an embodiment of the present invention taken in conjunction with the appended drawings. As used herein, the term system is a logical set of a plurality of apparatuses, and these apparatuses are not necessarily housed in the same case.

BRIEF DESCRIPTION OF THE DRAWINGS

FIG. 4 is an illustration of an example enabling key block (EKB) used for delivery of the various keys and data.

FIG. 20 is a diagram showing an example process for decoding and using content using an enabling key block (EKB).

BEST MODE FOR CARRYING OUT THE INVENTION

The structure of the present invention is described in detail hereinbelow. The description is made in the context of items listed below:

1. Content Providing System Overview
2. Regarding Tree Structure as Key Distribution Mechanism
3. EKB-based Key Distribution
4. EKB Format
5. Category Classification of Tree
6. Content Purchase and Preview Process
7. Backup/Restoration Process
8. Secondary Distribution of Content Based on Recommendation File

[1. Content Providing System Overview]

Figure 1:
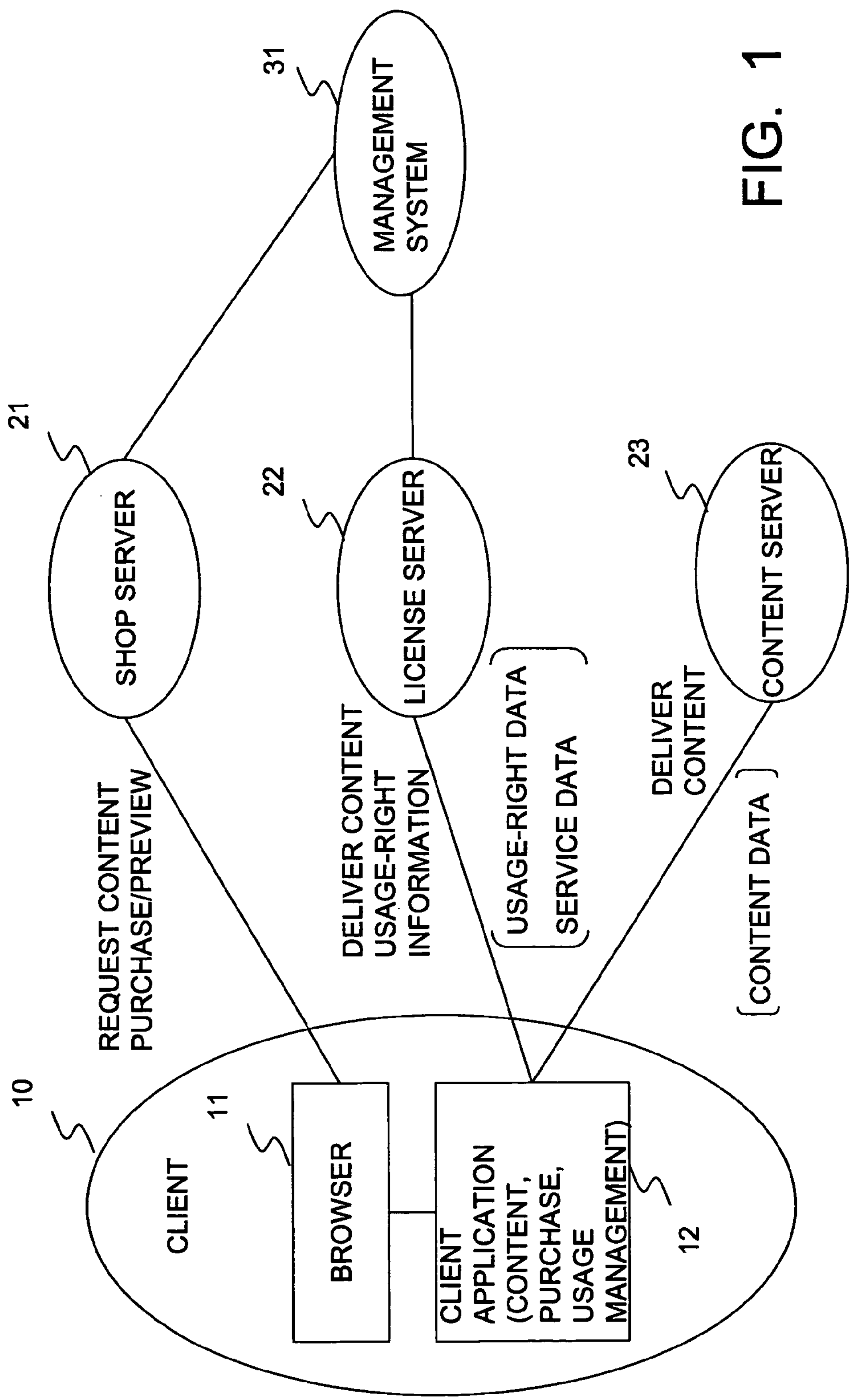
FIG. 1 is a schematic diagram showing the overview of a content providing system according to the present invention.

FIG. 1 is a diagram showing the overview of a content providing system in accordance with the present invention. A client 10 which uses content is an information processing apparatus serving as a device capable of using, or playing back, the content, such as a PC or a PDA. The client 10 has a browser 11 and a client application 12, which are implemented in software, and a controller, such as a CPU, executes programs of the browser 11, the client application 12, and the like.

The client application 12 is an application for performing a content purchase and preview process on the client, a process for obtaining license information including service data and content usage-right information, as described below, a backup/restoration process of content and license information, a content usage-right checking process, a content playback management process, a process for generating a recommendation file serving as a content file for secondary distribution, and so on. The client application 12 is stored as a processing program in the client information processing apparatus, as described in detail below. As used herein, "preview" includes not only audible preview of audio data but also visual preview of image data.

The client 10 is connected to a shop server 21, a license server 22, and a content server 23 via a communication network, such as the Internet. The content server 23 sends content to the client 10. The license server 22 sends usage-right information of the content to be used by the client to the client 10. The shop server 21 functions as a contact accessed by the client 10 to purchase the content. The shop server 21 provides the content which can be purchased or previewed via the browser, and receives a purchase or preview request from the client. The shop server 21 also performs a billing operation for the purchased content, if necessary.

The shop server 21 and the license server 22 are also connected with a management system 31. The management system 31 issues a transaction ID (TID) serving as permission information in response to a content request from the client 10 received by the shop server 21, and also issues content download permission information. The management system 31 further authorizes the license server 22 to issue usage-right data (Usage Right) serving as content usage-right information. The details of these processes are described below.

The client 10 obtains the usage right from the license server 22 and the content from the content server 23 under the control of the client application 12. The client 10 starts the browser 11 under the control of the client application 12 to perform a preview and payment process for the information provided by the shop server 21.

Although only one client, shop server, license server, and content server are shown in FIG. 1, multiple clients, shop servers, license servers, and content servers are connected across a communication network, such as the Internet. Each client is free to access various shop servers to select desired items from the content provided by the shop servers to obtain the content from a content server which stores the selected content. The client further selects a license server which issues the usage right of the obtained content to obtain the usage right from the selected license server.

The content is sent as encrypted content to the client 10 from the content server 23. The license server 22 also sends the content usage-right information corresponding to the content to the client 10. The usage-right information is verified by the client application 12 of the client 10, and the encrypted content is decoded when it is determined the usage right is present.

The client 10 has key information for allowing content use based on the content usage right, that is, key data including an enabling key block (EKB), a device node key (DNK), and so forth. The enabling key block (EKB) and the device node key (DNK) are key data for obtaining an encryption key necessary for content use, which allows only the user device having the authorized content usage right to decode and use the encrypted content. The EKB and the DNK are described below.

The content server 23 encrypts content, and sends the encrypted content to the client 10. The license server 22 generates usage-right information (Usage Right) based on content usage rules and conditions, and sends the generated usage right to a client 10. The license server 22 further generates service data based on the device node key (DNK) and enabling key block (EKB) provided by the management system 31, and sends the generated service data to the client 10. The service data includes an enabling key block (EKB) having a service device node key (SDNK) necessary for decoding the encrypted content.

The content usage rules include a requirement on a limited use period, a limited time the content can be copied, a limited number of portable media (PM) which can concurrently use the content (this number corresponds to the number of so-called check-outs), and so on. The portable media (PM) are storage media for use in portable devices, such as a flash memory, of a mini HD, an optical disk, a magneto-optical disk, and an MD (Mini Disk).

Figure 2:
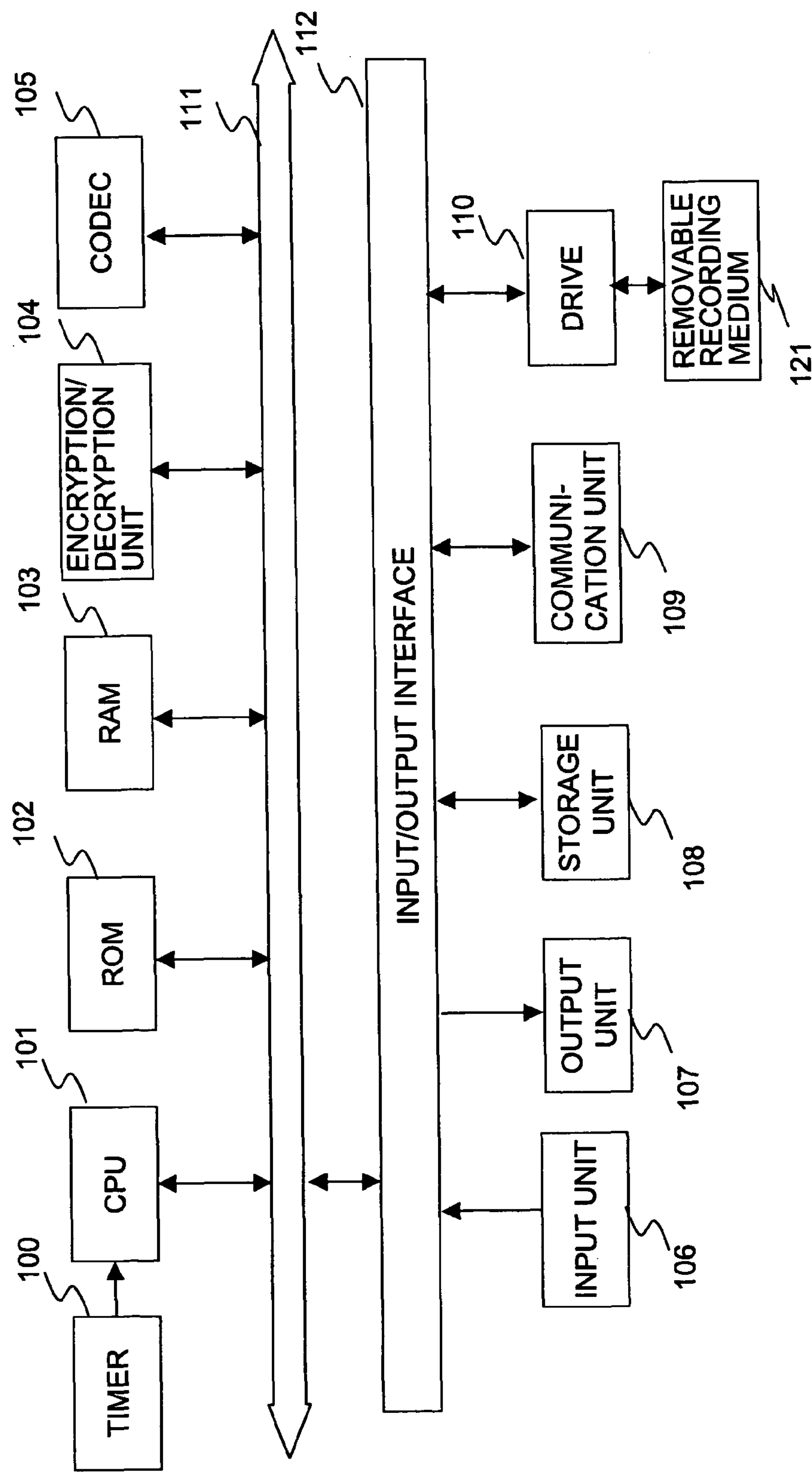
FIG. 2 is a diagram showing an example structure of each of a client, servers, and a management system.

An example structure of an information processing apparatus which can function as each of the client 10, the shop server 21, the license server 22, the content server 23, and the management system 31 is shown in FIG. 2. Each system is realized by storing a process program corresponding to each operation in a system having a CPU, such as a PC or a server.

An example structure of each system will be described with reference to FIG. 2. A CPU (Central Processing Unit) 101 executes various operations according to various programs stored in a ROM (Read Only Memory) 102 or a program stored in a storage unit 108 and loaded to a RAM (Random Access Memory) 103. A timer 100 performs a clock operation, and supplies clock information to the CPU 101.

The ROM (Read Only Memory) 102 stores a program used by the CPU 101, calculation parameters, fixed data, and so on. The RAM (Random Access Memory) 103 stores a program used for execution of the CPU 101, parameters which appropriately vary depending upon the executed program, and so on. These components are connected with each other via a bus 111, such as a CPU bus.

An encryption/decryption unit 104 performs a content encryption and decryption process, an encryption process using, for example, a DES (Data Encryption Standard) encryption algorithm, which is applied to a device node key (DNK) and an enabling key block (EKB), a MAC generation and verification process, etc. The encryption/decryption unit 104 also performs various encryption processes, such as authentication for transmission and reception of content or license information between this device and another device connected thereto, and session key sharing process.

A codec unit 105 encodes and decodes data using various techniques, such as ATRAC (Adaptive Transform Acoustic Coding)-3, MPEG, and JPEG. The data to be processed is input via the bus 111, an input/output interface 112 from a removable storage medium 121 via a drive 110 or from a communication unit 109. The processed data is stored in the removable storage medium 121 or is output from the communication unit 109 according to necessity.

An input unit 106, including a keyboard amd a mouse, an output unit 107 including a display, such as a CRT or an LCD, and a speaker, the storage unit 108 such as a hard disk, the communication unit 109 formed of a modem, a terminal adapter, etc., are connected with the input/output interface 112 so as to transmit and receive data over a communication network, such as the Internet.

[2. Regarding Tree Structure as Key Distribution Mechanism]

A device and key management mechanism using a tree, which is one form of broadcast encryption scheme which enables only a client having an authorized content usage right to use the content will be described.

Figure 3:
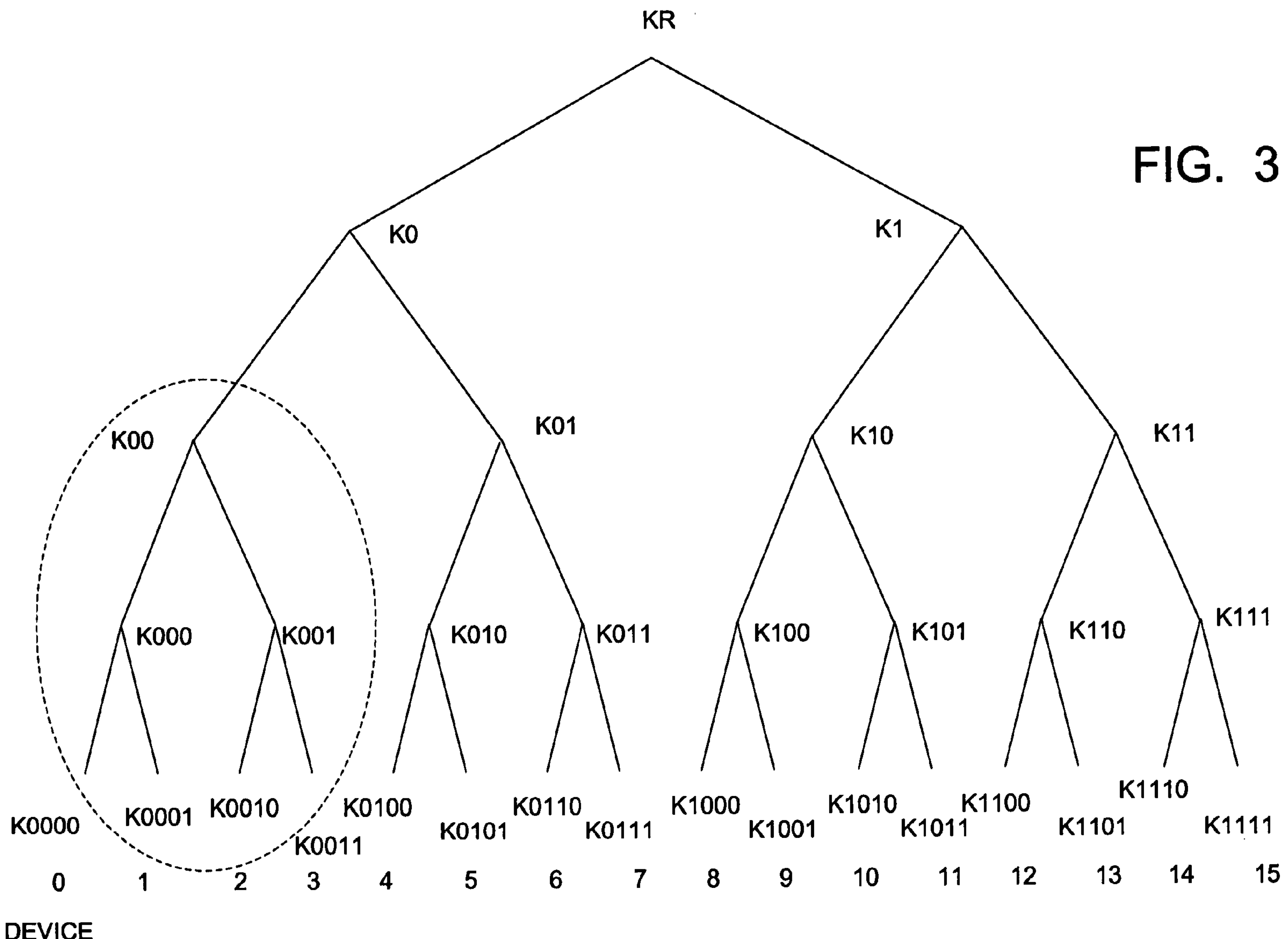
FIG. 3 is a tree structural view showing a process for encrypting various keys and data and a process for delivering the encrypted keys and data.

In FIG. 3, devices numbered 0 to 15 at the bottom are user devices serving as clients which use the content. Leaves of the hierarchical tree structure shown in FIG. 3 correspond to devices.

Each of the devices 0 to 15 stores a key set (device node key (DNK)) formed of keys (node keys) assigned to the nodes from the leaf of each device to the root in the tree shown in FIG. 3 and a leaf key of each leaf in its memory when or after each device is manufactured or shipped. In FIG. 3, K0000 to K1111 at the bottom are leaf keys assigned to the devices 0 to 15, respectively, and keys KR to K111 from the KR (root key) at the top to keys assigned to the nodes in the second layer from the bottom are node keys.

In the tree structure shown in FIG. 3, for example, the device 0 has a leaf key K0000, and node keys K000, K00, K0, and KR. The device 5 has K0101, K010, K01, K0, and KR. The device 15 has K1111, K111, K11, K1, and KR. In the tree shown in FIG. 3, only 16 devices 0 to 15 are shown, and the tree has a symmetrical structure with four layers; however, the tree may include more devices and may have a different number of layers in different portions of the tree.

The devices in the tree structure shown in FIG. 3 include various types of devices using various recording media such as a DVD, CD, MD, and flash memory embedded in the devices or removable from the devices. A variety of application services can also co-exist. Such co-existence of different devices and different applications is applied with the hierarchical tree structure shown in FIG. 3, which is a content or key distribution mechanism.

In a system in which various devices and applications co-exist, for example, the components encircled with a dotted line shown in FIG. 3, that is, the devices 0, 1, 2, and 3, are combined into one group using the same recording medium. For example, the devices belonging to the group encircled with the dotted line are collectively subjected to processing, such that common content is encrypted and is sent to the devices from a provider, a content key shared with the devices is sent to the devices, or content-fee-payment data is encrypted and is output to a provider, a settlement organization, or the like. An organization which transmits and receives data to and from the devices, such as a content server, a license server, or a shop server, sends the data to the portion encircled with the dotted line shown in FIG. 3, or a group of the devices 0, 1, 2, and 3, at the same time. The tree shown in FIG. 3 includes a plurality of groups. An organization which transmits and receives data to and from the devices, such as a content server, a license server, or a shop server, functions as message-data delivery means.

The node keys and the leaf keys may be managed together by a single management system having a key management center function, or may be managed group-by-group by the message-data delivery means, such as a provider or settlement organization, which transmits and receives various data to and from each group. The node keys and the leaf keys are renewed by a management system having a key management center function, a provider, a settlement organization, or the like, for example, if the keys are intercepted.

In the tree structure, as is apparent from FIG. 3, each of the four devices 0, 1, 2, and 3 belonging to the group has a device node key (DNK), i.e., a device node key (DNK) containing the shared keys K00, K0, and KR. This node key sharing mechanism allows, for example, a common key to be sent to only the devices 0, 1, 2, and 3. For example, the shared node key K00 is a common key shared by the devices 0, 1, 2, and 3. Distribution of a value Enc(K00, Knew) formed by encrypting a new key Knew using the node key K00 to the devices 0, 1, 2, and 3 via a network or by means of a recording medium having the value allows only the devices 0, 1, 2, and 3 to use their shared node key K00 to decode the encrypted value Enc(K00, Knew) to obtain the new key Knew. Enc(Ka, Kb) represents data formed by encrypting Kb using Ka.

If it is discovered at a certain time t that the keys K0011, K001, K00, K0, and KR owned by the device 3 have been compromised and revealed by an attacker (hacker), in order to protect data to be exchanged thereafter in the system (a group of the devices 0, 1, 2, and 3), the device 3 must be separated from the system. Therefore, it is necessary to renew the node keys K001, K00, K0, and KR to keys K(t)001, K(t)00, K(t)0, and K(t)R, respectively, and to report the renewed keys to the devices 0, 1, and 2. As used herein, K(t)aaa represents a renewed key at generation t of a key Kaaa.

A process for distributing a renewed key will now be described. Key renewal is carried out by supplying a table formed of block data, called an enabling key block (EKB) shown in, for example, FIG. 4(A), to the devices 0, 1, and 2, for example, over a network or by means of a recording medium having the table stored therein. The enabling key block (EKB) is formed of encrypted keys for distribution of renewed keys to the devices corresponding to the leaves of the tree structure shown in FIG. 3. The enabling key block (EKB) may be referred to as a key renewal block (KRB).

The enabling key block (EKB) shown in FIG. 4(A) is formed as block data having a data structure which can be updated only by the devices whose node key must be renewed. The example shown in FIG. 4 indicates block data formed for the purpose of distributing renewed node keys at generation t to the devices 0, 1, and 2 in the tree structure shown in FIG. 3. As is apparent from FIG. 3, the device 0 and the device 1 need the renewed node keys K(t)00, K(t)0, and K(t)R, and the device 2 needs the renewed node keys K(t)001, K(t)00, K(t)0, and K(t)R.

As indicated by the EKB shown in FIG. 4(A), the EKB includes a plurality of encrypted keys. The encrypted key at the bottom is Enc(K0010, K(t)001), which is formed by encrypting the renewed node key K(t)001 using the leaf key K0010 of the device 2. The device 2 can use its leaf key to decode the encrypted key to obtain K(t)001. The device 2 can further use the K(t)001 obtained as a result of decoding to decode the encrypted key Enc(K(t)001, K(t)00) in the second row from the bottom shown in FIG. 4(A) to obtain the renewed node key K(t)00. Likewise, the device 2 can decode the encrypted key Enc(K(t)00, K(t)0) in the second row from the top shown in FIG. 4(A) to obtain the renewed node key K(t)0, and can decode the encrypted key Enc(K(t)0, K(t)R) in the first row from the top shown in FIG. 4(A) to obtain K(t)R. On the other hand, the devices K0000 and K0001 whose node key K000 need not be renewed require the renewed node keys K(t)00, K(t)0, and K(t)R. The devices K0000 and K0001 decode the encrypted key Enc(K000, K(t)00) in the third row from the top shown in FIG. 4(A) to obtain K(t)00, decode the encrypted key Enc(K(t)00, K(t)0) in the second row from the top shown in FIG. 4(A) to obtain the renewed node key K(t)0, and decode the encrypted key Enc(K(t)0, K(t)R) in the first row from the top shown in FIG. 4(A) to obtain K(t)R. The devices 0, 1, and 2 can therefore obtain the renewed key K(t)R. The index shown in FIG. 4(A) represents the absolute address of the node key and leaf key used as a decoding key.

In a case where the renewed node keys K(t)0 and K(t)R in higher layers of the tree structure shown in FIG. 3 are not required and only the node key K00 need be renewed, an enabling key block (EKB) shown in FIG. 4(B) can be used to distribute the renewed node key K(t)00 to the devices 0, 1, and 2.

The EKB shown in FIG. 4(B) is useful for, for example, distribution of a new content key shared in a particular group. In a specific example, it is assumed that the devices 0, 1, 2, and 3 in a group encircled with a dotted line shown in FIG. 3 use a given recording medium and require a new common content key K(t)con. In this case, data Enc(K(t), K(t)con) formed by encrypting a new common renewed content key K(t)con using the renewed K(t)00 of the node key K00 common to the devices 0, 1, 2, and 3 is distributed together with the EKB shown in FIG. 4(B). Therefore, this data can be distributed as data which cannot be decoded by a device in other groups, such as the device 4.

Specifically, the devices 0, 1, and 2 use K(t)00 obtained by processing the EKB to decode the above-described encrypted text to obtain a key at the time t, for example, the content key K(t)con used to encrypt/decode the content.

[3. EKB-based Key Distribution]

Figure 5:
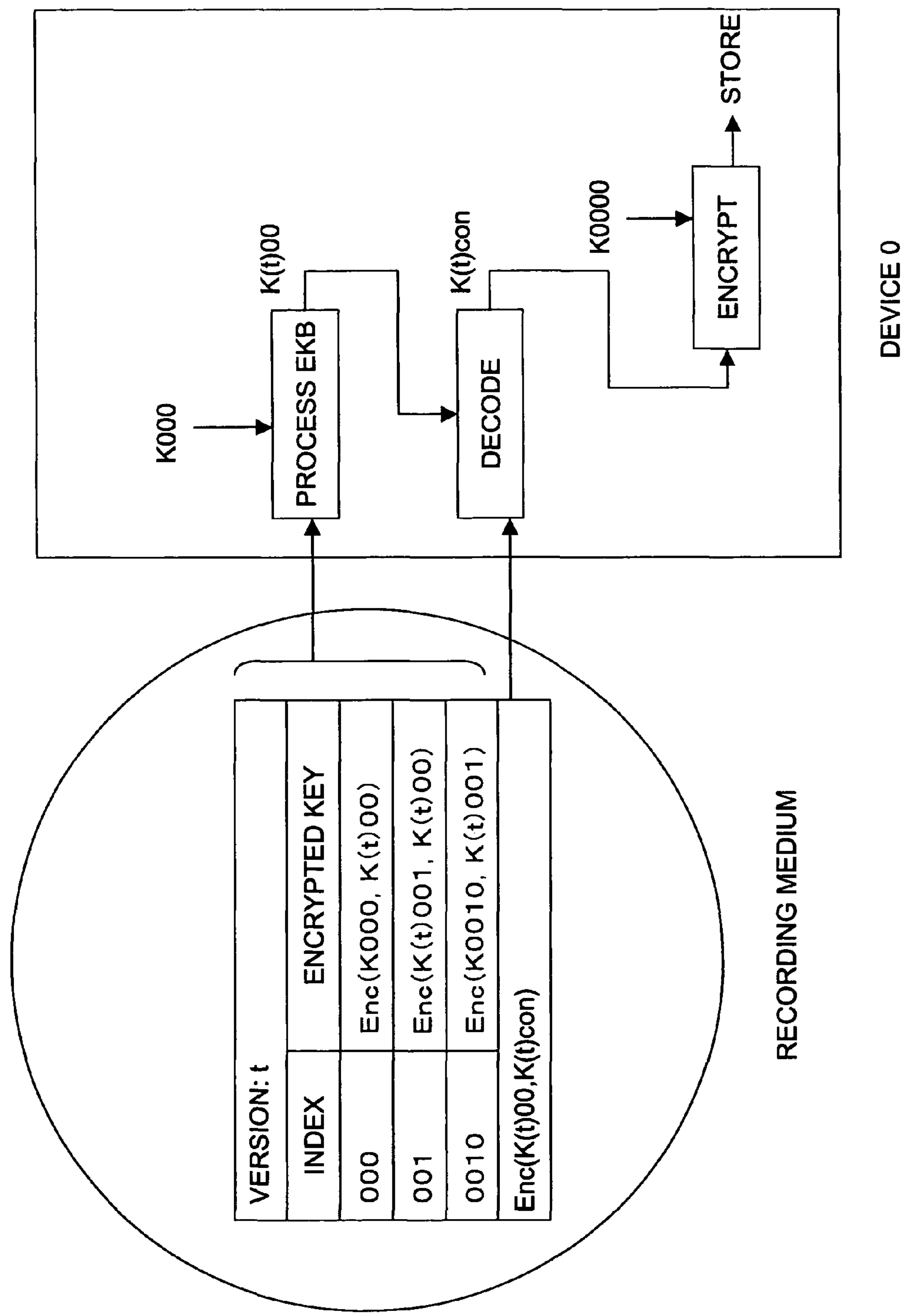
FIG. 5 is an illustration of an example delivery and decoding process of a content key using an enabling key block (EKB).

FIG. 5 shows a process for obtaining the key at the time t, for example, the content key K(t)con used to encrypt/decode the content, showing, for example, the processing of the device 0 which receives the data Enc(K(t)00, K(t)con) formed by encrypting the new common content key K(t)con using K(t)00, and the EKB shown in FIG. 4(B) by means of a recording medium. In this example, the encrypted message data formed of an EKB is the content key K(t)con.

As shown in FIG. 5, the device 0 performs the EKB processing, which is similar to that described above, using the EKB at the generation t stored in the recording medium and the node key K000 stored in advance by the device 0 to generate the node key K(t)00. The device 0 further uses the decoded renewed node key K(t)00 to decode the renewed content key K(t)con, and encrypts the decoded renewed content key K(t)con using the leaf key K0000 owned only by the device 0, which is then stored for later use.

[4. EKB Format]

Figure 6:
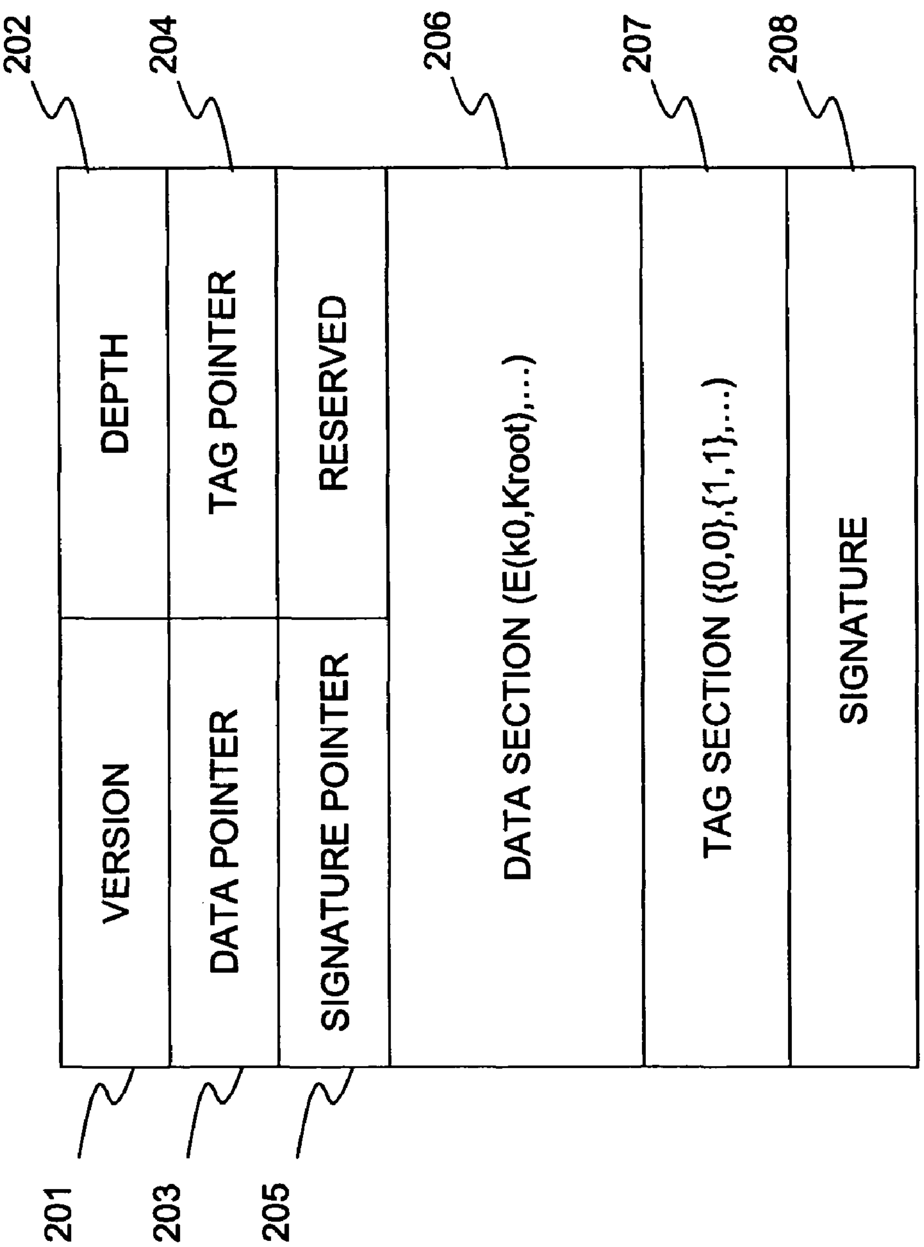
FIG. 6 is a view showing an example format of an enabling key block (EKB).

FIG. 6 shows an example format of an enabling key block (EKB). A version 201 is an identifier indicating the version of the enabling key block (EKB). The version 201 has functions of identifying the latest EKB and indicating the correspondence with the content. A depth 202 indicates the number of layers in the hierarchical tree for the devices to which the enabling key block (EKB) is distributed. A data pointer 203 is a pointer indicating the location of a data section 206 in the enabling key block (EKB), and a tag pointer 204 and a signature pointer 205 are pointers indicating the location of a tag section 207 and a signature 208, respectively.

A data section 206 contains data obtained by, for example, encrypting renewed node keys. The data section 206 contains, for example, the encrypted keys of the renewed node keys, etc., shown in FIG. 5.

Figure 7:
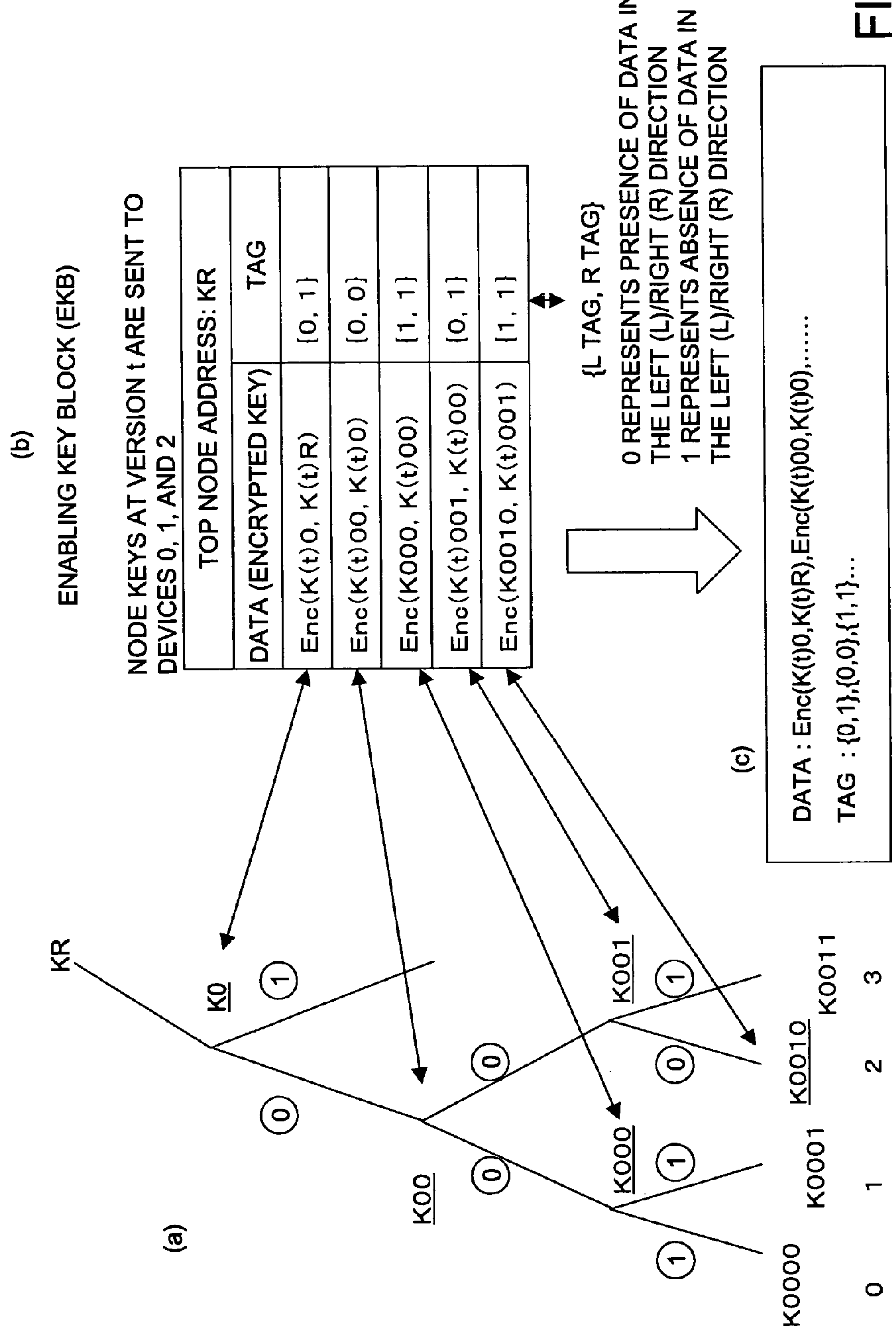
FIG. 7 is an illustration of the tag structure of the enabling key block (EKB).

A tag section 207 includes tags indicating the positional relationship between the encrypted node keys stored in the data section 204 and the leaf keys. An allocation rule for the tags will be described with reference to FIG. 7. In FIG. 7, the enabling key block (EKB) described above with reference to FIG. 4(A) is sent as data, by way of example. This data is indicated by the table (b) shown in FIG. 7. The address of the top node contained in the encrypted key is referred to as a top node address. In this example, the renewed key K(t)R of the root key is contained, and the top node address is KR. For example, the data Enc(K(t) 0, K(t)R) in the top layer is located at position indicated in a hierarchical tree shown in FIG. 7(*a*). The subsequent data is Enc(K(t) 00, K(t) 0), and is located at the position left below the previous data in the tree. The tag is set to 0 in case of presence of data, and is set to 1 in case of absence of data. The tags are defined as {left (L) tag, right (R) tag}. The data Enc(K(t) 0, K(t)R) in the top row is allocated L tag=0 because data is located to the left, and is allocated R tag=1 because data is not located to the right. All the remaining data are allocated tags, and a data string and tag string shown in FIG. 7(*c*) are configured.

The tags are allocated in order to indicate at which position of the tree structure data Enc(Kxxx, Kyyy) is located. The key data Enc(Kxxx, Kyyy) . . . stored in the data section 206 is merely a data sequence of encrypted keys. The tags can be used to determine at which position of the tree the encrypted keys stored as data are located. It is possible to configure, for example, the following data structure using the node indexes corresponded with the encrypted data described above with reference to FIG. 4 without tags:

0: Enc(K(t) 0, K(t)root)

00: Enc(K(t) 00, K(t)0)

000: Enc(K((t) 000, K(t)00)

However, such a data structure using indexes is redundant, i.e., has a large amount of data, and is not suitable for network-based distribution, etc. In contrast, as described above, tags are used as index data indicating the position of keys to determine the position of keys with a smaller amount of data.

Referring back to FIG. 6, the EKB format will further be described. A signature 208 includes an electronic signature handled by, for example, a management system having a key management center function, a content server, a license server, a shop server, or the like which issues an enabling key block (EKB). A device which received the EKB checks the signature to determine whether or not the obtained EKB is the enabling key block (EKB) issued by the authorized enabling key block (EKB) issuer.

[5. Category Classification of Tree]

A mechanism in which a hierarchical tree stricture defining the node keys, etc., is classified into categories of the devices to efficiently renew the keys, distribute the encrypted keys, and distribute the data will be described hereinbelow.

Figure 8:
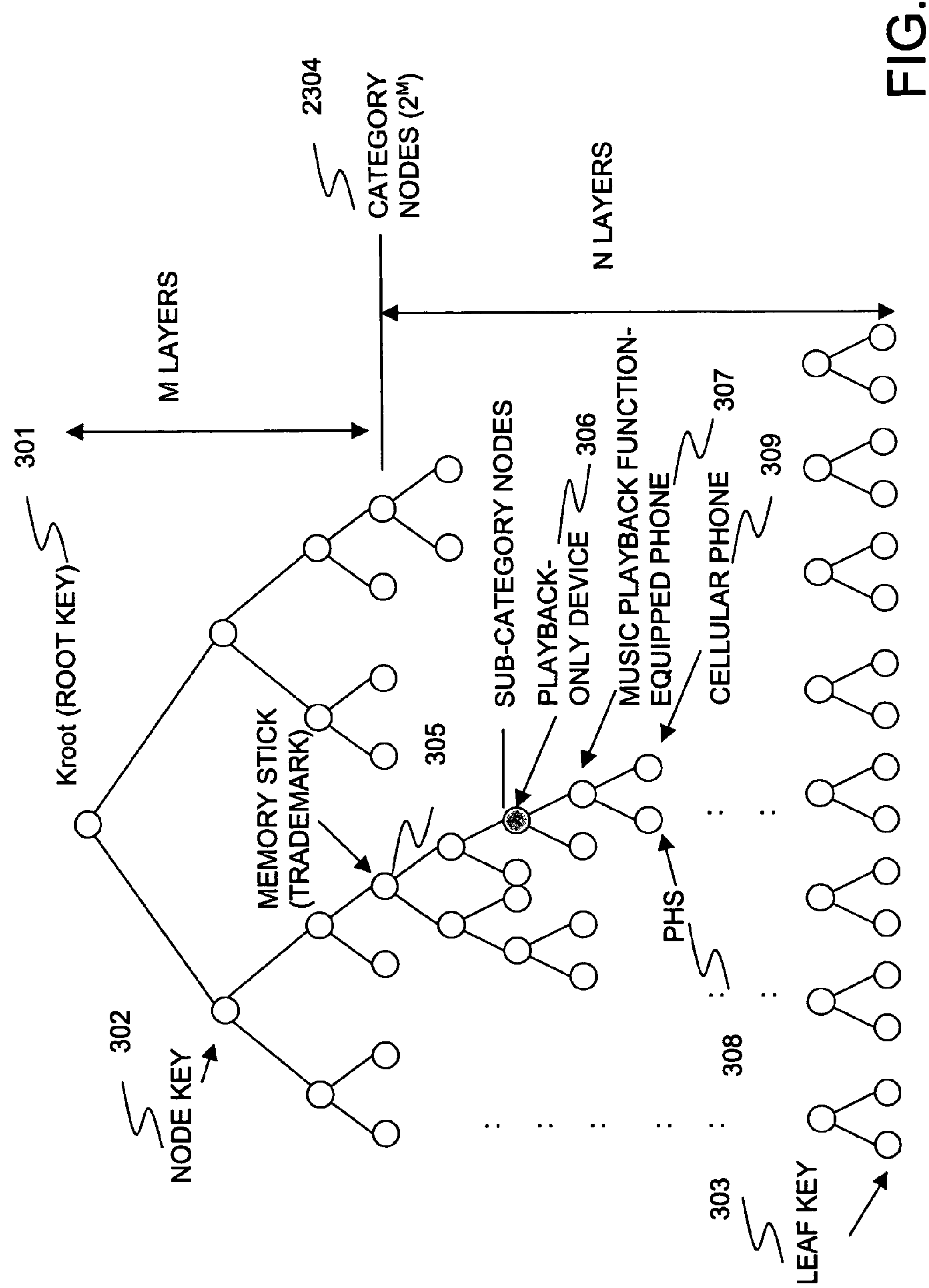
FIG. 8 is an illustration of category division in the tree structure.

FIG. 8 shows an example of category classification in the hierarchical tree structure. In FIG. 8, a root key Kroot 301 is set at the top of the hierarchical tree structure, node keys 302 are set in the lower intermediate layers, and leaf keys 303 are set at the bottom. Each device has an individual leaf key, a series of node keys from the leaf key to the root key, and the root key.

As an example, predetermined nodes at the top down to the M-th layer are set as predetermined nodes 304. That is, each of the nodes in the M-th layer is set as a node to which a specific category of device is assigned. One of the nodes in the M-th layer is set as the top, and the nodes in the (M+1)-th and the following layers and the leaves are the nodes and leaves associated with the devices belonging to this category.

For example, a node 305 in the M-th layer shown in FIG. 8 is assigned a category [memory stick (trademark)]., and the nodes and leaves which follow this node are set as category-specific nodes or leaves including various devices using a memory stick. Thus, the nodes below the node 305 are defined as a set of nodes and leaves associated with the devices defined in the memory stick category.

The nodes in the layers several layers below the M-th layer can be set as sub-category nodes 306. For example, as shown in FIG. 8, a node in the layer two layers below the layer of the category [memory stick] node 305 is assigned a sub-category node belonging to the category of the devices using a memory stick, called a [playback-only device] node 306. A music playback function-equipped phone node 307 belonging to the playback-only device category can be configured below the playback-only device node 306 that is a sub-category node, below which a [PHS] node 308 and a [cellular phone] node 309 belonging to the category of music playback function-equipped phones can be configured.

The categories and sub-categories can be set based on device types as well as arbitrary units, such as unique management nodes of a manufacturer, a content provider, a settlement organization, etc., that is, processing units, management units, or provided service units (these are hereinafter collectively referred to as entities). For example, assuming that a category node is assigned the top node specific to a game device XYZ commercially available from a game device manufacturer, the node keys and leaf keys in the layers below the top node layer can be stored in the game device XYZ commercially available from the manufacturer, and the game device XYZ can be sold. Thereafter, an enabling key block (EKB) formed by the node keys and leaf keys under the top node key is generated and distributed, thus allowing distribution of data such that distribution of encrypted content or distribution or renewal of various keys can be used only on the devices under the top node.

Accordingly, one node is set as the top, and the node below this node are set as nodes associated with categories or sub-categories assigned to this top node. This enables a manufacturer, a content provider, or the like which manages a top node in a category or sub-category layer to uniquely generate an enabling key block (EKB) having this node as the top and to distribute the generated EKB to the devices belonging to the top node. Therefore, renewal of keys can be carried out without any effect on devices which do not belong to the top node but which belong to another category node.

Figure 9:
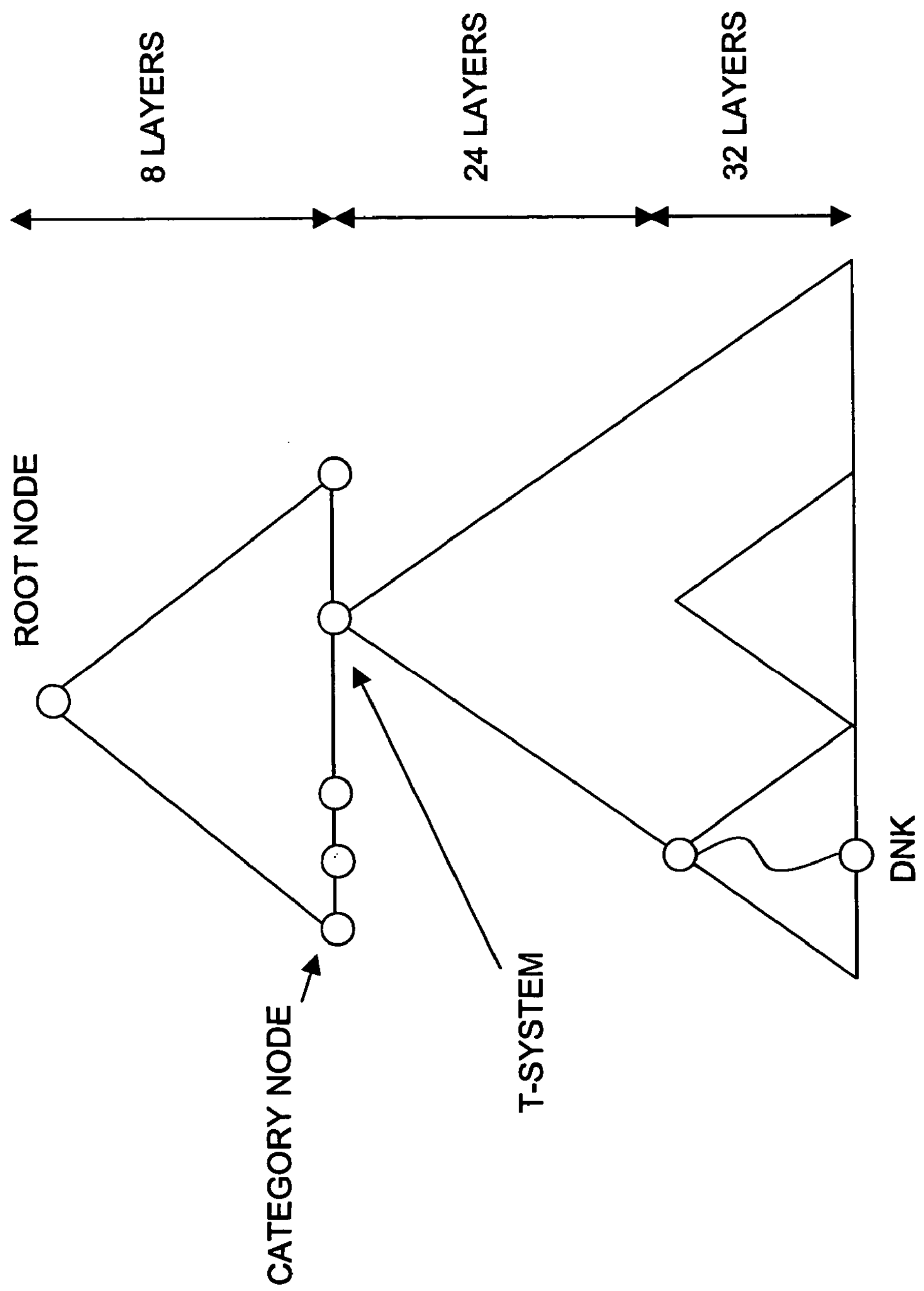
FIG. 9 is an illustration of category division in the tree structure.

In the system of the present invention, as shown in FIG. 9, keys are managed using a system having a tree structure. In the example shown in FIG. 9, nodes in 8+24+32 layers form a tree, and the nodes in the eight layers below and including the root node are associated with categories. As used herein, the term category means a category, such as a category such as the category of devices using a semiconductor memory, for example, a memory stick, or the category of digital broadcast receiving devices. One of the category nodes is associated with the present system (referred to as a T-system) serving as a license management system.

The keys corresponding to the nodes in the 24 layers below the layer of the T-system node are associated with service providers or services provided by the service providers. In this example, therefore, $2^{24}$ (about 16-mega) service providers or services can be assigned. At the bottom of the 32 layers, $2^{32}$ (about four-giga) users (or user devices) can be assigned. The key corresponding to the nodes on a path starting with a node in the 32nd layer at the bottom and ending with the T-system node constitute a DNK (Device Node Key), and an ID corresponding to the leaf at the bottom is referred to as a leaf ID.

For example, the content key with which the content is encrypted is encrypted using a renewed root key KR', and renewed node keys in a high layer are encrypted using renewed node keys in the layer directly below that layer. These encrypted keys are arranged in an EKB. Renewed node keys in the layer one layer higher than the end in the EKB are encrypted using node keys at the end of the EKB or the leaf keys, and are then arranged in the EKB.

A user device uses any key of the DNK written in service data to decode the renewed node keys in the layer directly higher than the layer written in the EKB delivered with the content data, and uses the key obtained as a result of decoding to decode renewed node keys in the layer further higher than the layer written in the EKB. The user device performs this operation in turn to obtain the renewed root key KR'.

As described above, category classification of a tree allows for a mechanism in which one node is set as the top and the nodes which follows the top node are set as nodes associated with a category or sub-category assigned to the top node. This enables a manufacturer, a service provider, etc., which manages a top node in a category or sub-category layer to uniquely generate an enabling key block (EKB) having this node as the top and to distribute the generated EKB to the devices belonging to the top node.

The mechanism in which the content is distributed and used by using the above-described EKB distribution system by managing devices using a tree structure to realize a multiple-category EKB distribution structure will now be described.

Figure 10:
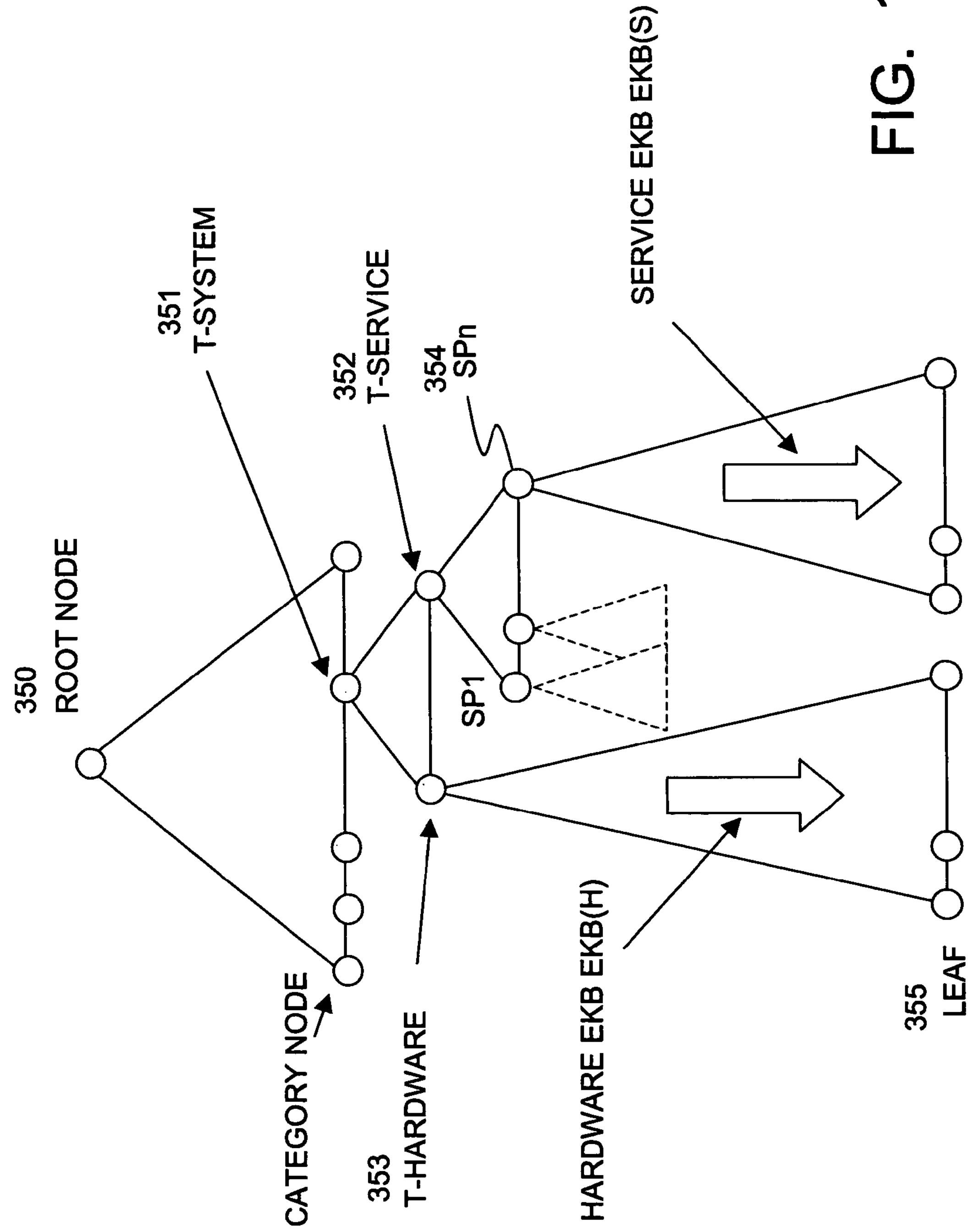
FIG. 10 is an illustration of a specific example of category-based division in the tree structure.

Two categories will be described below with reference to FIG. 10. As shown in FIG. 10, a T-system node 351 is configured below a root node 350, and a T-service node 352 and a T-hardware node 353 are configured below the T-system node 351. A tree whose top node is the T-hardware node 353 is a category tree in which a user device is set as a leaf 355 and a hardware EKB [EKB(H)] to be issued to the device is delivered. On the other hand, a tree whose top node is the T-service node 352 is a category tree in which a service EKB [EKB(S)] to be issued to a service provided for a user device is delivered.

Each of the hardware EKB [EKB(H)] and the service EKB [EKB(S)] has a DNK (Device Node Key) assigned to an authorized device, i.e., the keys corresponding to the nodes on a path starting with the leaf and ending with the T-system node, which is used to decode each EKB.

[6. Content Purchase and Preview Process]

The details of a process for a client to purchase or preview the content will be described with reference to FIG. 11 and the subsequent figures.

Figure 11:
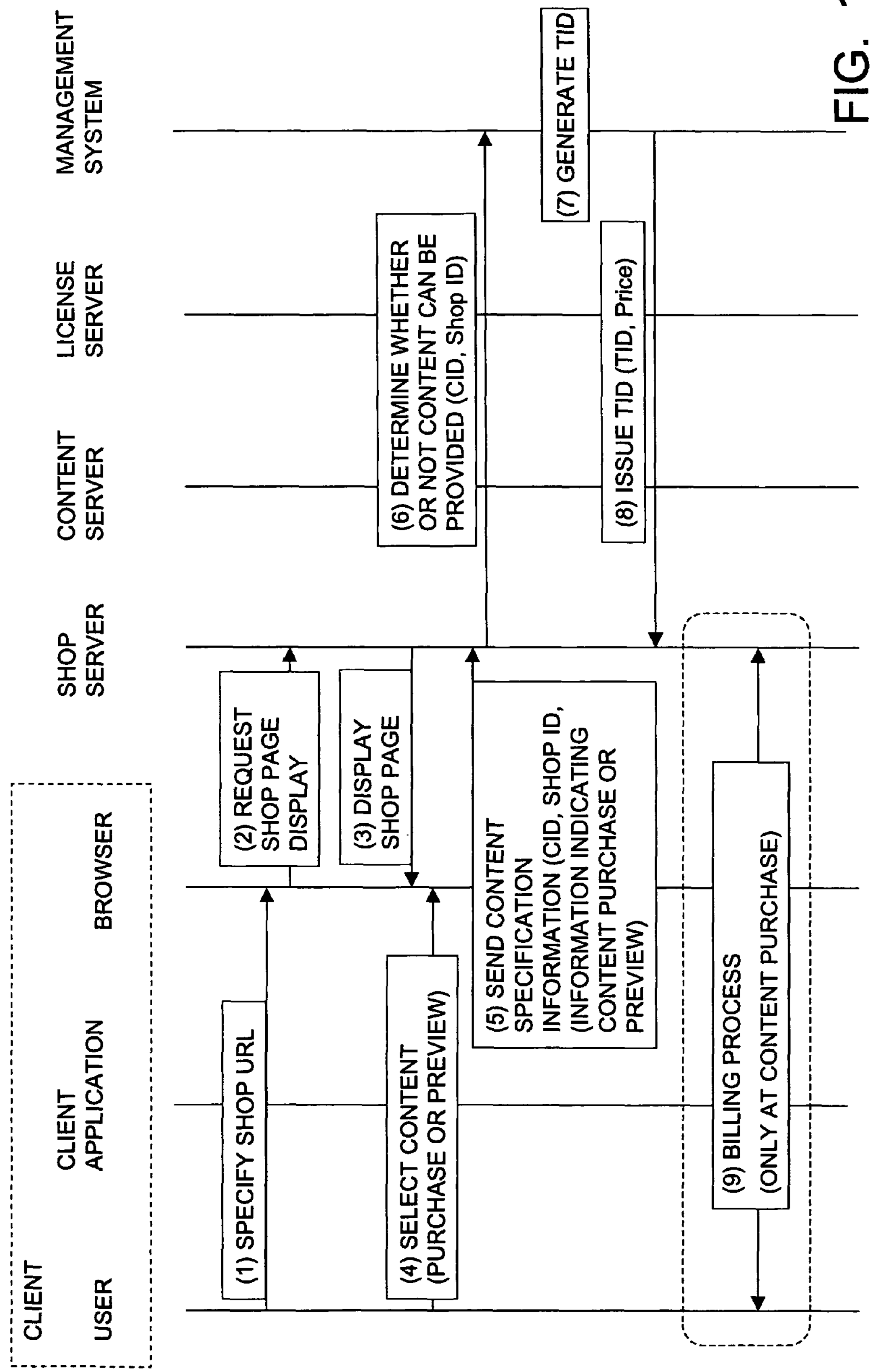
FIG. 11 is a chart showing a sequence (part 1) of operation steps performed between entities in a content purchase or preview process.

FIG. 11 shows an initial communication sequence of steps in a content purchase process performed between a client having a client application and a browser, such as a PC, and a shop server, a content server, a license server, and a management system. The process shown in the sequence diagram will be described hereinbelow.

First, a user on the client side who wants to purchase the content specifies a URL (step (1)) on its information processing apparatus having a communication capability, such as a PC, so as to read a content list view (shop page) provided by the shop server via the browser (step (2)) and display the content list view on a display pane (step (3)).

The client selects the content from the content list provided by the shop server and determines whether the selected content is purchased or previewed (step (4)). Then, the client sends request data to the shop server via the browser (step (5)). The request data contains a content ID (CID), a shop server identifier (Shop ID), and data indicating whether the content is purchased or previewed.

Upon receipt of the content purchase or preview request from the client, the shop server requests the management system to determine whether or not the content can be provided (step (6)). This request contains a content ID (CID) and a shop server identifier (Shop ID).

Figure 12:
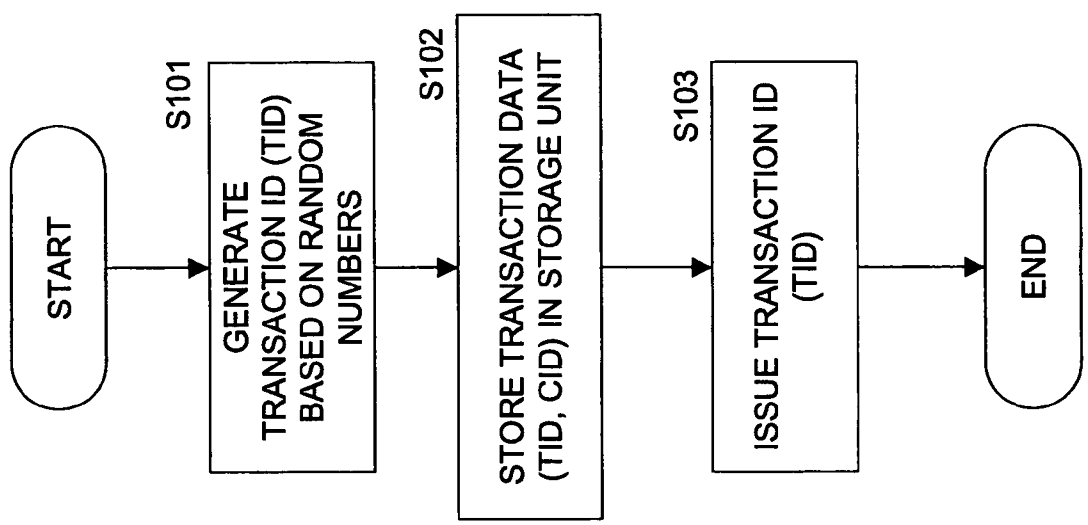
FIG. 12 is a flow diagram showing a procedure for generating and issuing a transaction ID performed in a management system.

Upon receipt of the request to determine whether or not the content can be provided, the management system issues a transaction ID (TID) (step (7)). The details of the transaction ID (TID) issuing process will be described with reference to the flowchart shown in FIG. 12.

First, in step S101, the management system generates random numbers, and generates a transaction ID (TID) based on the generated random numbers. In step S102, the generated transaction ID (TID) and the content ID (CID) specified by the shop server are associated with each other, and are stored as transaction data in a storage unit. Then, the generated transaction ID (TID) is output and issued to the shop server.

Referring back to the sequence diagram shown in FIG. 11, after generating the transaction ID (TID), the management system sends the generated transaction ID (TID) and price information, as TID information, to the shop server (step (8)). The price information is information requested only for purchasing the content, and is not contained in the content preview process. The shop server which has received the TID information performs a billing process (step (9)) based on the price contained in the TID information when a content purchase request was made by the client.

When a content preview request, not a content purchase request, was made by the client, the billing process (step (9)) is omitted.

The subsequent process will be described with reference to the sequence diagram shown in FIG. 13. The shop server sends a download permission request for the content to be purchased or previewed to the management system on the condition that, in the content purchase process, the billing process has been performed or on the condition that, in the content preview process, the TID information has been received from the management system (step (10)).

Figure 14:
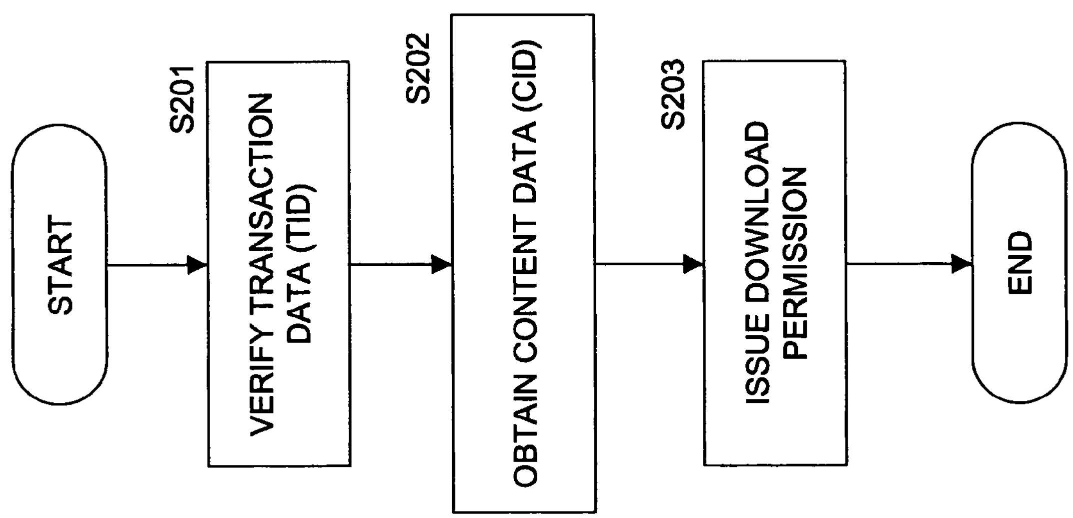
FIG. 14 is a flow diagram showing a download permission procedure performed in the management system.

Upon receipt of the download permission request, the management system verifies the download permission request (step (11)). The details of the download permission request verification process will be described below with reference to the flowchart shown in FIG. 14.

First, in step S201, the management system matches the transaction ID (TID) contained in the received download permission request with the transaction ID (TID) previously generated and stored in the storage unit. In step S202, the management system obtains the content ID (CID) recorded in association with the verified transaction ID (TID), and, in step S203, issues a download permission of the content corresponding to the CID.

Figure 13:
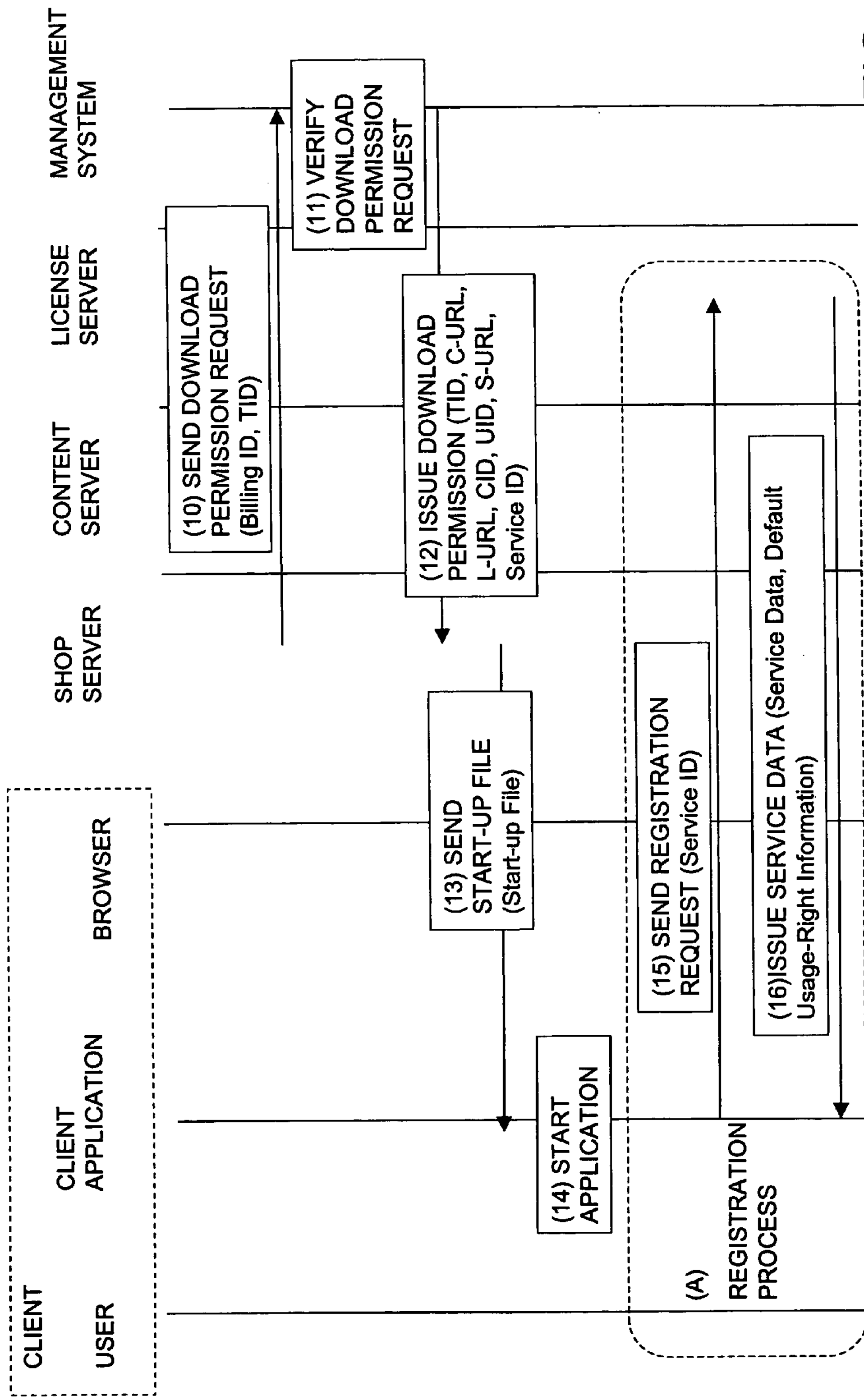
FIG. 13 is a chart showing a sequence (part 2) of operation steps performed between the entities in the content purchase or preview process.

Referring back to the sequence diagram shown in FIG. 13, after checking the download permission request (step (11)), the management system issues a content download permission to the shop server (step (12)). The download permission contains a transaction ID (TID), a content server URL (C-URL), a license server URL (L-URL), a content ID (CID), a usage-right information ID (UID), an item (content) URL (S-URL), and a service ID.

Upon receipt of the download permission from the management system, the shop server generates a start-up file for starting a content using (playback, etc.) program in the client application, and sends the generated start-up file to the client application via the browser of the client.

Figure 15:
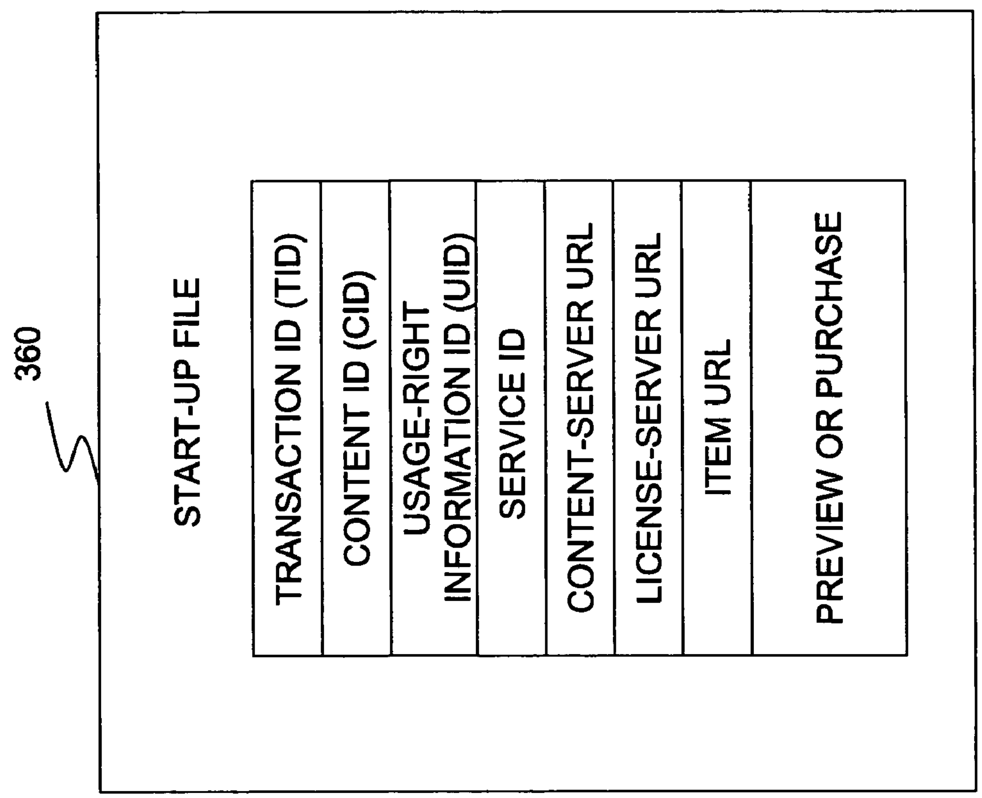
FIG. 15 is a view showing an example data structure of a start-up file.

An example of the start-up file will be described with reference to FIG. 15. A start-up file 360 contains the transaction ID (TID) generated by the management system, the content ID (CID) of the content to be purchased or previewed by the client, the usage-right information ID (UID) contained in the download permission information generated by the management system, the service ID contained in the download permission information generated by the management system, the URL of the license server, the URL of the item (content), and identification data indicating a content purchase or preview process.

The identification data indicating a content purchase or preview process may be configured such that identifiers for the purchase process and the preview process differ from each other and the client application determines which identifier is set in the start-up file to start an appropriate one of the purchase and preview applications.

The client application starts the application depending upon the start-up file (step (15)).

The application starting process performed by the client application will be described with reference to FIG. 16. First, in step S301, it is determined whether or not the client system, or the information processing apparatus, has the service data corresponding to the service ID contained in the start-up file.

The service data is received from the license server when the client wants to receive various services, for example, a content-using service, and is, for example, data which authorizes the overall service usage right of the services provided by a specific service provider. An example data structure of the service data is shown in FIG. 17(*a*).

Figure 17:
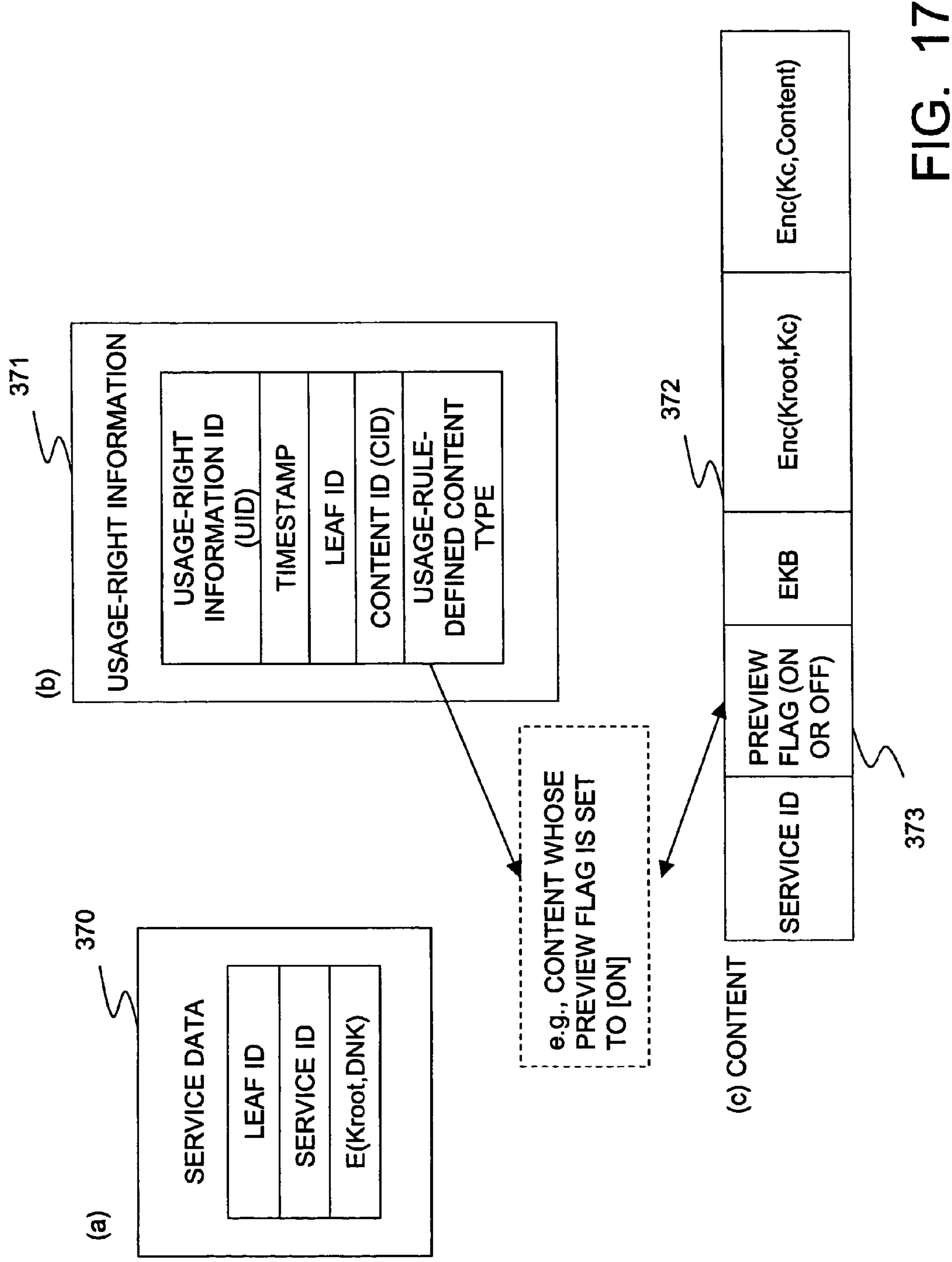
FIG. 17 is a view showing an example data structure of service data and usage-right information.

As shown in FIG. 17(*a*), service data 370 contains a leaf ID unique to a client set in an EKB distribution tree, a service ID serving as a service identifier, and data E(Kroot, DNK) formed by encrypting a device node key (DNK) using a root key (Kroot). In order to receive the service data, the client must be registered in the license server. The registration process is indicated in steps (15) and (16) shown in FIG. 13.

Figure 16:
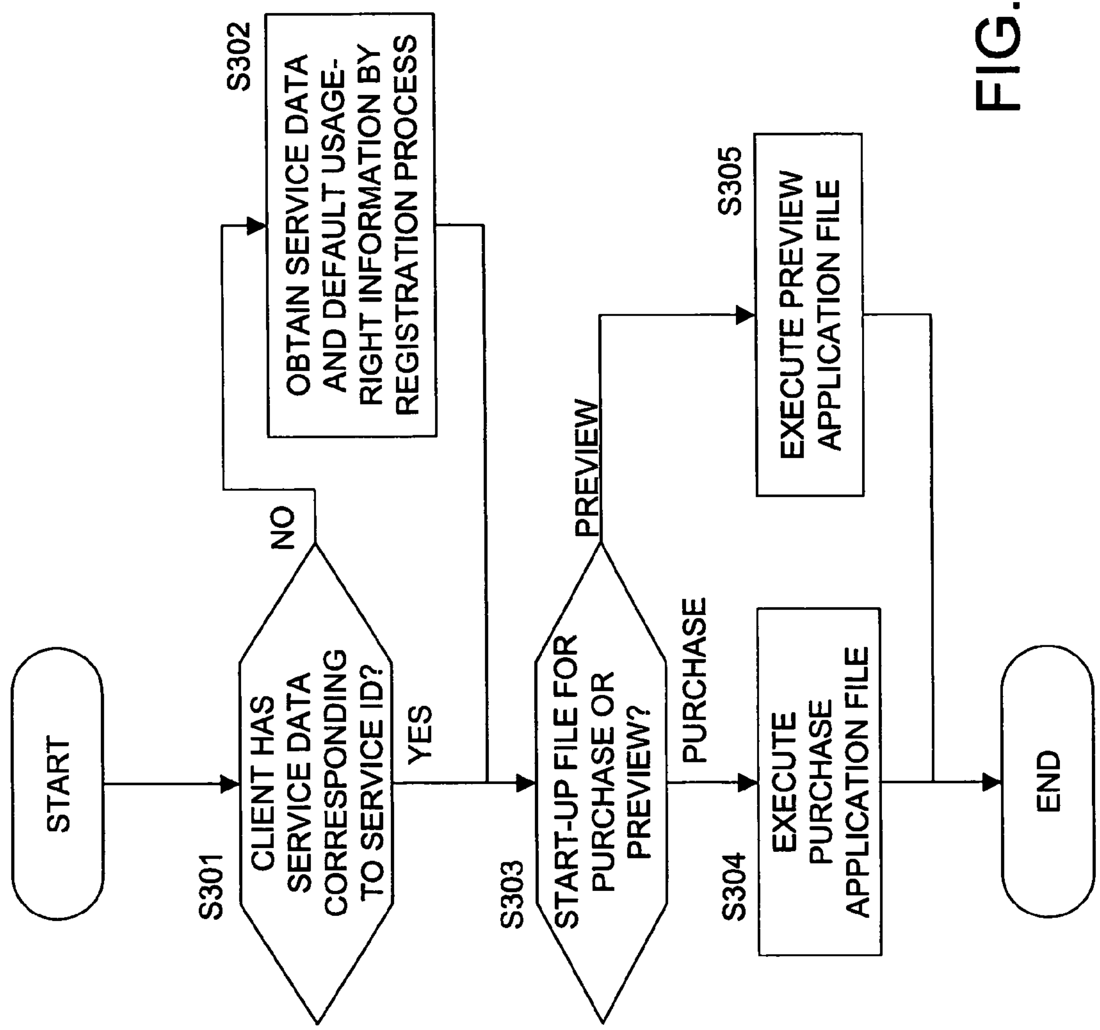
FIG. 16 is a flow diagram showing an application executing procedure based on the start-up file performed by a client.

If it is determined in step S301 shown in FIG. 16 that the client does not have the service data corresponding to the service ID, a registration process is performed in step S302 to receive the service data.

In the registration process, default usage-right information is issued to the client from the license server. Standard usage-right information contains usage rules and conditions of the purchased content, and is issued when the content is purchased; whereas, the default usage-right information is not issued on the condition that the content is purchased, but is issued on the condition that the client is registered or the service data is issued. The default usage-right information is used as content usage-right information for effective use in the content preview process, as described below.

An example data structure of the usage-right information is shown in FIG. 17(*b*). As shown in FIG. 17(*b*), usage-right information 371 contains a usage-right information ID serving as a usage-right information identifier, a timestamp serving as information indicating the time and date of issuance, a leaf ID unique to the client, a content ID, if the information is issued for content purchase, and usage-rule-defined content type information.

Since the default usage-right information is not issued for specific purchased content, the content ID is omitted, or is replaced by an ID commonly used for the content which can be previewed. The usage-rule-defined content type information is configured such that, for example, the content whose preview flag is set to ON can be used. As shown in FIG. 17(*c*), content 372 includes a preview flag 373. The content whose preview flag 373 is set to ON indicates the content which can be previewed, and the content whose preview flag is set to OFF indicates the content which cannot be previewed.

For playback of preview-content, the client application refers to the default usage-right information to determine whether or not the content can be played back, and verifies the flag of the content to play back the content. This process is described below.

Referring back to the flowchart shown in FIG. 16, the procedure for starting an application will be described. After the registration process in step S302, that is, after the service data and the default usage-right information has been obtained from the license server, it is determined in step S303 whether the start-up file received from the shop server is a start-up file for a purchase application or a start-up file for a preview application. If it is a start-up file for a purchase application, the purchase application is executed in step S304. If it is a start-up file for a preview application, the preview application is executed in step S305.

Figure 18:
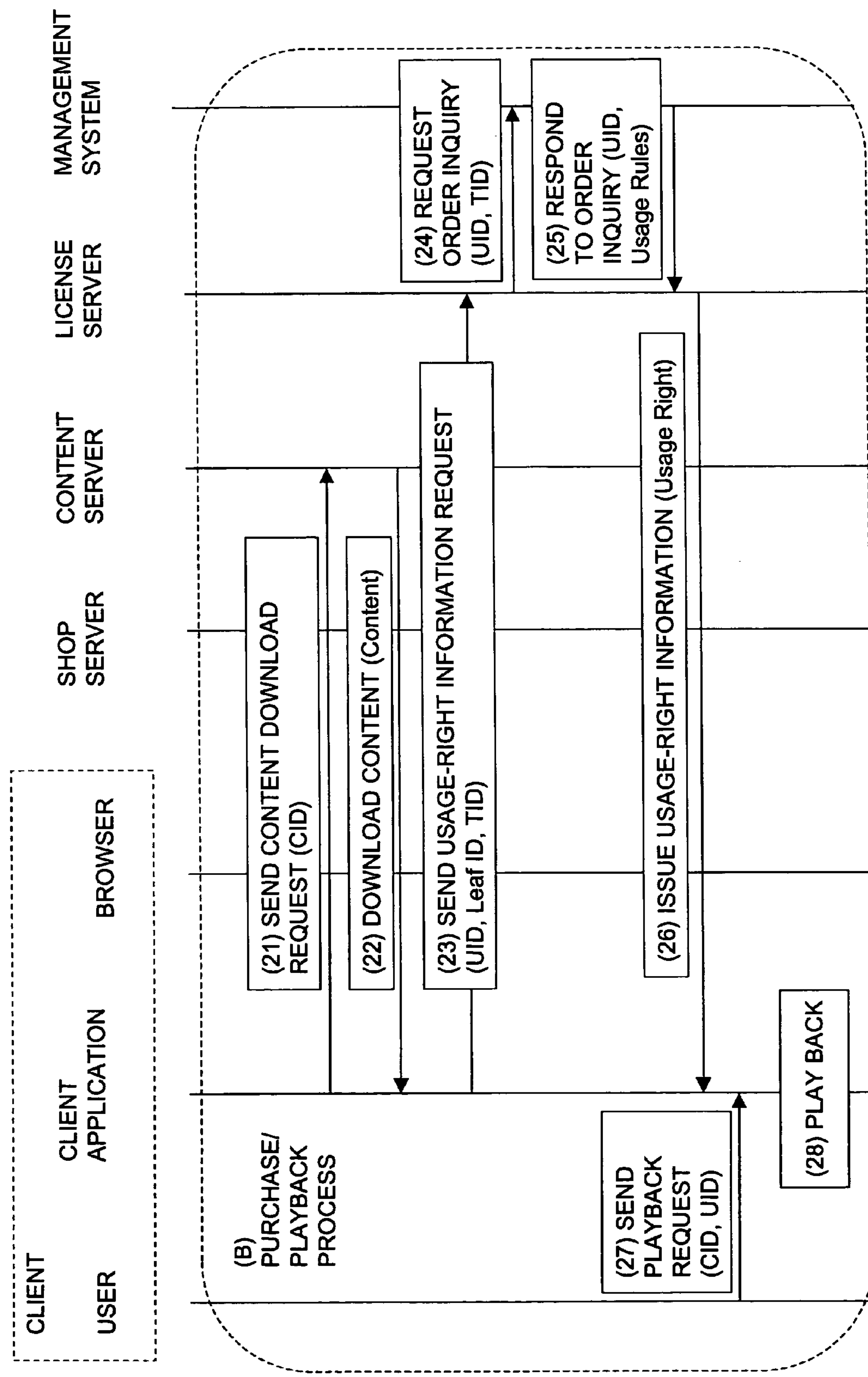
FIG. 18 is a chart showing a sequence of operation steps performed between the entities in the content purchase process.

A sequence of steps for executing the purchase application will be described with reference to the sequence diagram shown in FIG. 18.

In the purchase process, the client application sends a content download request to the content server (step (21)). A purchase request of this content has been sent from the client, and the content corresponds to the content ID (CID) recorded in the usage-right information (see FIG. 17(*b*)). The client application specifies content based on the content ID (CID) to send a download request of the content to the content server.

Upon receipt of the content download request, the content server sends content information corresponding to the CID to the client (step (22)). The content information contains the encrypted content, and is formed of a file in which the content data Enc(Kc, Content) encrypted using a content key Kc, the data Enc(Kroot, Kc) formed by encrypting the content key Kc using a root key Kroot, the EKB for obtaining the root key Kroot, and information, such as the preview flag data and the service ID, shown in FIG. 17(*c*), are added.

The client which has received the content information sends a request for obtaining usage-right information (Usage Right) corresponding to the received content to the license server (step (23)). The request contains the usage-right information ID (UID) contained in the start-up file (see FIG. 15) previously received from the shop server, the leaf ID serving as client identification data, and the transaction ID (TID) contained in the start-up file (see FIG. 15) previously received from the shop server.

Upon receipt of the usage-right information (Usage Right) obtaining request, the license server 381 sends an order inquiry to the management system (step (24)). This request contains the usage-right information ID (UID) and the transaction ID (TID). Upon receipt of the order inquiry, the management system sends response information defining the usage rules corresponding to the usage-right information ID (UID) to the license server in response to the order inquiry (step (25)).

Upon receipt of the response information, the license server generates usage-right information (Usage Right) having content usage rules, and issues the generated usage-right information to the client (step (26)). The content usage rules are formed of the time the content can be played back, the expiry, and permission information of various operations, such as content copying and checkout to an external device.

The client which has received the usage-right information (Usage Right) is able to use the content previously received from the content server based on the usage rules recorded in the usage-right information (Usage Right). When a content playback request is sent from the user while specifying a content ID (CID) and a usage-right information (Usage Right) ID (step (27)), the client application performs a content playback process according to the usage rules (step (28)).

Figure 19:
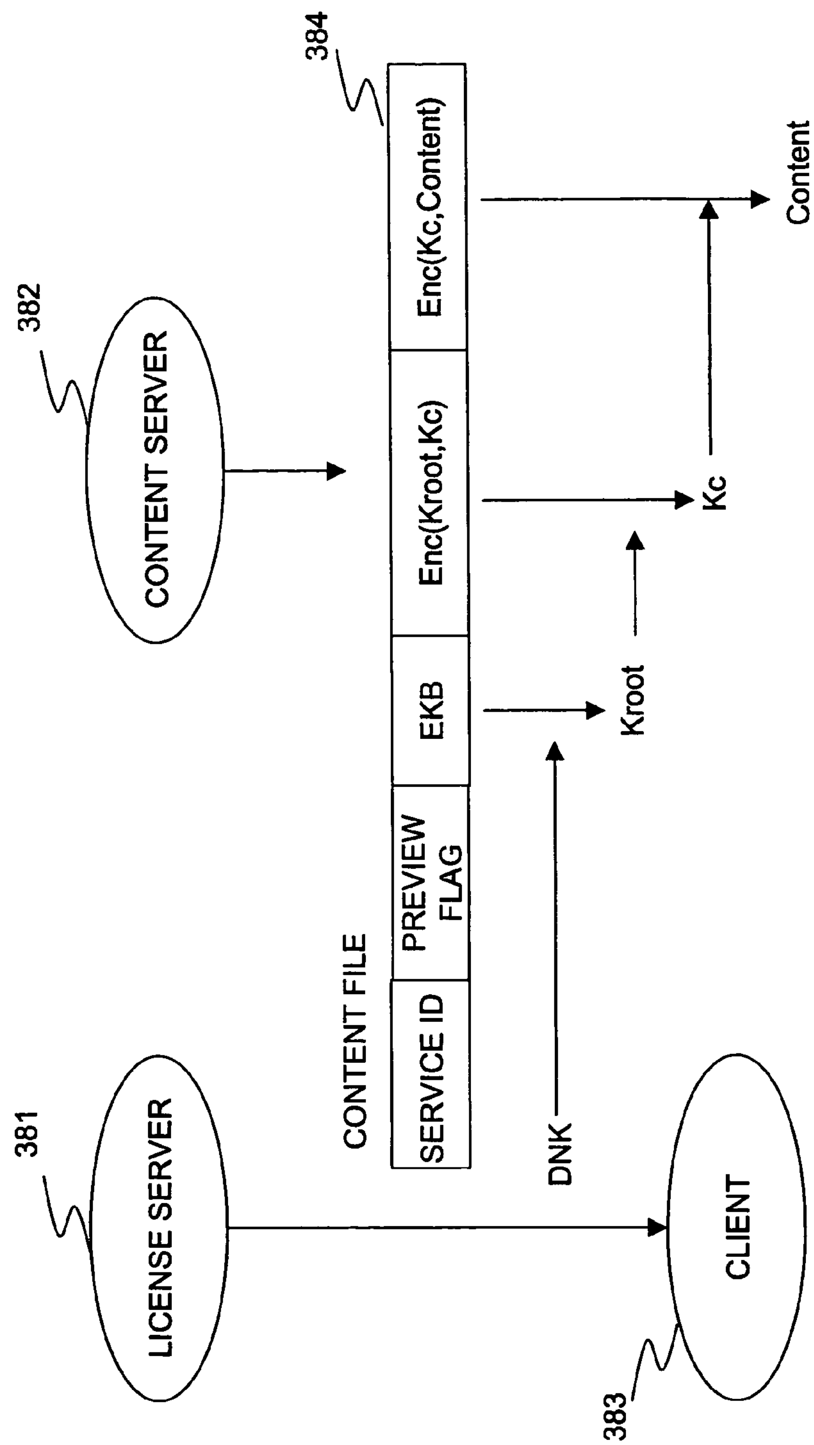
FIG. 19 is a diagram showing the overview of a content playback process.

A basic content playback procedure will be described with reference to FIG. 19. As is anticipated from the foregoing description, content is provided for a client 383 by a content server 382, and service data and usage-right information (Usage Right) are licensed from a license server 381 to the client 383.

The content has been encrypted using a content key Kc, i.e., Enc(Kc, Content), and the content key Kc is a key obtained from a root key Kroot which can be obtained from an EKB.

The client 383 obtains a device node key (DNK) from the service data received from the license server, and decodes an EKB in a content file 384 based on the obtained DNK to obtain the root key Kroot. The client 383 further uses the obtained root key Kroot to decode Enc(Kroot, Kc) to obtain the content key Kc, and decodes the encrypted content Enc(Kc, Content) using the obtained content key Kc to obtain the content for playback.

The details of a content playback process in association with service data and usage-right information (Usage Right) will be described with reference to FIG. 20.

FIG. 20 is a sequence diagram showing a content-using process based on a content decoding process using a hardware EKB [EKB(H)] and a service EKB [EKB(S)].

Service data 401 and usage-right information 403 shown in FIG. 20 are data received from a license server, and an encrypted content file 402 is data received from a content server. The service data 401 contains a leaf ID serving as a leaf identifier, the version of the used EKB, and data E(Kroot', SDNK) formed by encrypting a service-specific device node key (SDNK) necessary to decode a service EKB [EKB(S)] using a root key Kroot' assigned in a hardware category tree.

The encrypted content file 402 is a file containing a service EKB [EKB(S)] having a root key Kroot assigned in a service category tree, data E(Kroot, CID+Kc) formed by encrypting a content ID (CID) and a content key (Kc) used for the content encrypting and decoding processes using the root key Kroot, and data E(Kc, Contet) formed by encrypting the content (Content) using the content key Kc.

The usage-right information 403 is data containing a leaf ID and usage-rule information of the content. The usage-rule information of the content includes various usage rules, such as a use period which is defined depending upon the content, the time the content can be used, and copy control. A user device which has received the usage-right information 403 stores the usage-right information 403 as security information of the content, or stores the usage-right information in an AV index file serving as content index data.

A user device having a large-capacity storage unit and a high-performance processor, such as a PC, can store usage-right information as security information of the content. Preferably, such a user device stores all usage-right information, and refers to the usage-right information stored therein to use the content. On the other hand, a user device which does not have a large-capacity storage unit and which has a low-performance processor, such as a portable device (PD), can store the usage-right information 403 formed of selected information in an AV index file serving as content index data, and can refer to the usage-rule information in the AV index file to use the content.

In step S501 shown in FIG. 20, the user device uses a hardware device node key (HDNK) 412 to decode a hardware EKB(H) 411 to obtain a root key Kroot' assigned in a hardware category tree from the EKB(H) 411. The DNK-based EKB process corresponds to a process in accordance with the technique described above with reference to FIG. 5.

In step S502, the root key Kroot' obtained from the EKB (H) 411 is used to decode the encrypted data E(Kroot', SDNK) of the service data 401 to obtain a device node key (SDNK) used for processing (decoding) the service EKB [EKB(S)].

In step S503, the device node key (SDNK) obtained from the service data is used to process (decode) the service EKB [EKB(S)] stored in the encrypted content file 402 to obtain a root key Kroot assigned in the service category tree stored in the service EKB [EKB(S)].

In step S504, the root key Kroot obtained from the service EKB [EKB(S)] is used to decode the encrypted data E(Kroot, CID+Kc) stored in the encrypted content file 402 to obtain a content ID (CID) and a content key (Kc).

In step S505, the content ID (CID) obtained from the encrypted content file 402 is matched with the content ID stored in the usage-right information. When it is determined as a result of matching that the content can be used, in step S506, the content key (Kc) obtained from the encrypted content file 402 is used to decode the encrypted content E(Kc, Content) stored in the encrypted content file 402 to play back the content.

As described above, the hardware EKB [EKB(H)] serving as an EKB corresponding to a category tree established for hardware devices, which are content-using devices, and the service EKB [EKB(S)] serving as an EKB corresponding to a category tree established for content-using services, can be individually provided for a user, thus allowing only the user having the authorized DNK for each EKB to use the services.

A DNK for decoding a service EKB [EKB(S)], i.e., an SDNK, can be provided as the service data 401 corresponding to the content, and the SDNK is encrypted using a root key Kroot' assigned in a hardware category tree which can be obtained only by a device having an authorized hardware DNK, i.e., an HDNK. This allows only a user device having the authorized HDNK to obtain the SDNK and to use the services.

In using the content, the content identifier (CID) obtained from the encrypted content file 402 is matched with the CID obtained from the usage-right information. It is therefore essential to the content playback process to obtain the usage-right information 403 having the CID information. This can realize content use in accordance with the usage rules.

The process in a case where the client application executes a preview application will be described with reference to the sequence diagram shown in FIG. 21.

In the preview process, like the content purchase process, it is possible to obtain the content file (see FIG. 19) and store it in a storage unit of the client system before the content is played back in a similar manner to purchased content; however, an example where a streaming playback is performed without storage in the storage unit will be described with reference to FIG. 21.

In the streaming preview process, the client application sends a content download request to the content server (step (31)). A preview request of this content has been sent from the client. The client application specifies content based on the content ID (CID) to send a download request of the content to the content server.

In streaming playback, the content server sequentially sends partial data of the content (content part) to the client (step (32)). The client which has received the content part plays back the received content part (step (33)), and sends a request of the remaining content parts to the content server. This process is consecutively performed to achieve streaming playback.

Figure 22:
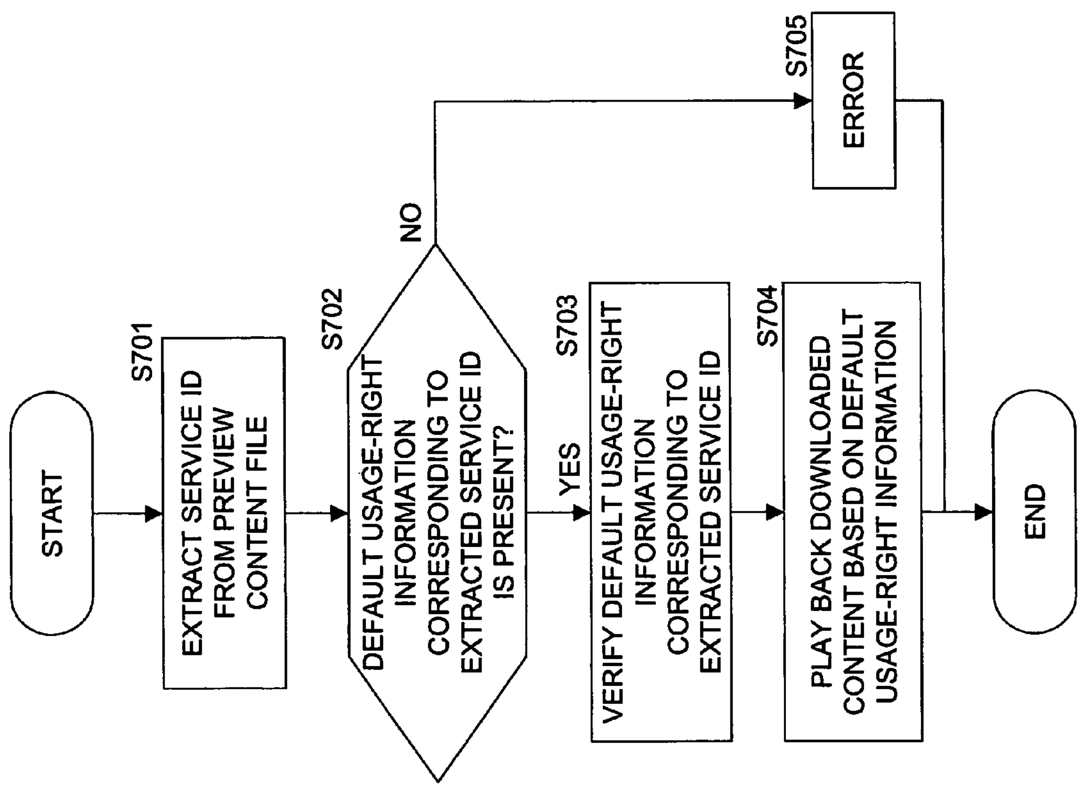
FIG. 22 is a flowchart showing the overview of a preview-content playback process.

A preview playback procedure will be described with reference to the flowchart shown in FIG. 22. In step S701, the client application obtains a service ID from a preview content file received from the content server.

In step S702, it is determined whether or not default usage-right information (Default Usage Right) (see FIG. 17(*b*)) corresponding to the extracted service ID is present. The default usage-right information is usage-right information which is sent together with the service data (see FIG. 17(*a*)) from the license server when the client is registered and which is used for the content which can be previewed, unlike the usage-right information issued for purchased content.

The content can be previewed on the condition that the default usage-right information (Default Usage Right) is possessed. If the default usage-right information is not possessed, an error occurs in step S705, and the process ends without playing back the content.

If the default usage-right information (Default Usage Right) has been stored, in step S703, the default usage-right information is verified to check the recorded usage right. The default usage-right information contains, for example, preview permission information of the content whose preview flag is on, and content ID information of the content which can be previewed, and such information is retrieved.

In step S704, the content is played back based on the usage rules of the default usage-right information (Default Usage Right). As described above with reference to FIGS. 19 and 20, the playback process involves a process for decoding the encrypted content received from the content server.

Like the process for playing back the purchased content described with reference to FIG. 20, also in previewing the content without purchasing the content, the EKB-based key obtaining process is required for obtaining the keys for decoding the content. This allows, for example, only the user having the authorized DNKs for the hardware EKB [EKB(H)] serving as an EKB corresponding to a category tree established for hardware devices, which are content-using devices, and the service EKB [EKB(S)] serving as an EKB corresponding to a category tree established for content-using services to play back the content, and to also preview the content with limited playback control.

As described above, the client obtains the default usage-right information (Default Usage Right) when it is registered to the license server, and can play back the content based on the default usage-right information in the content preview process without purchasing the content, thus allowing the user to preview and play back the content without purchasing the content. The client which is permitted to preview the content is limited to a client which has been registered to the license server to obtain the default usage-right information. This prevents preview-data from being randomly distributed.

Figure 21:
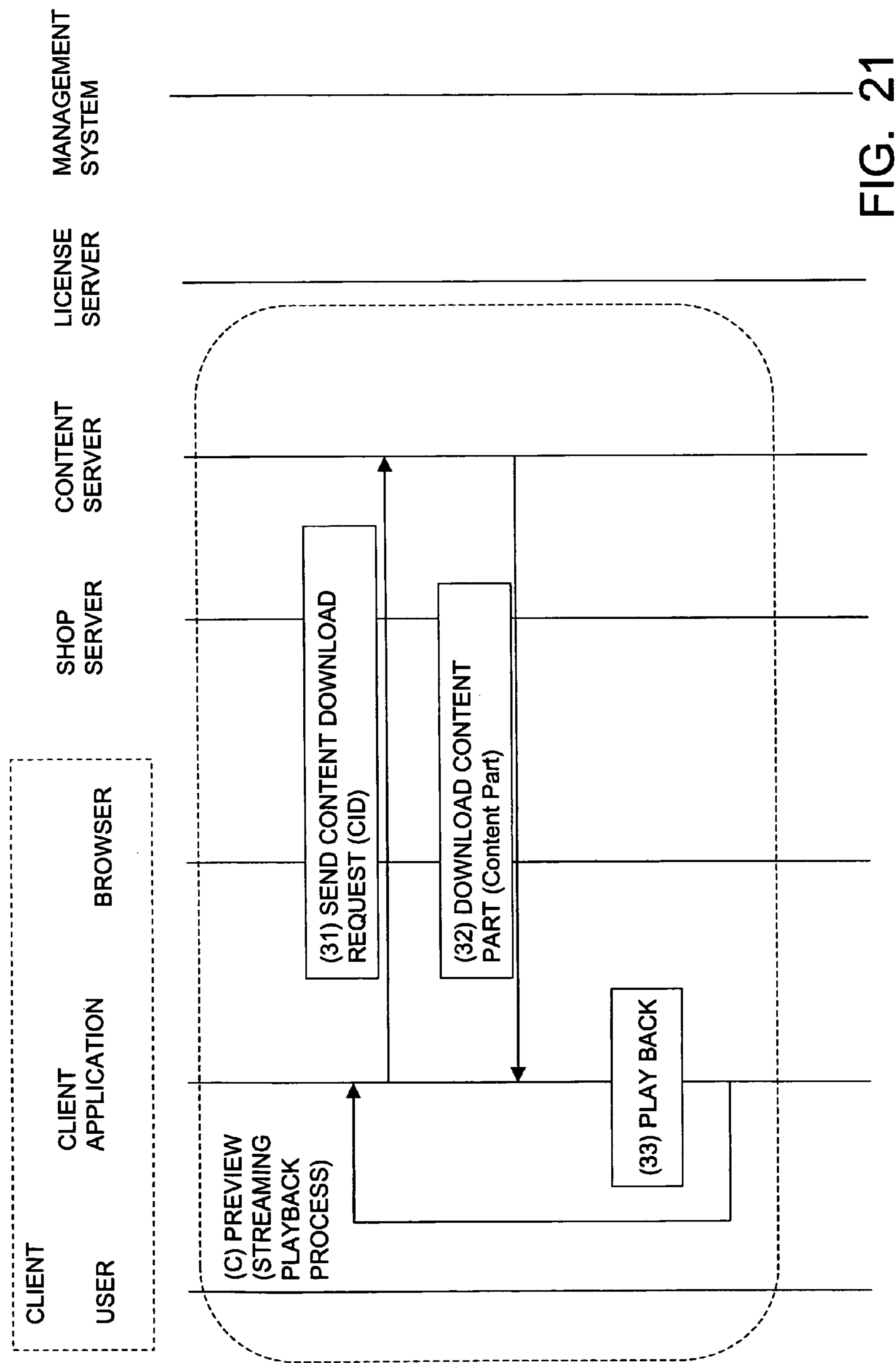
FIG. 21 is a chart showing a sequence of operation steps performed between the entities in the content preview process.

Streaming playback is shown in the sequence diagram shown in FIG. 21, by way of example. However, preview-data may be stored in a storage medium of the client and may be played back by determining whether or not default usage-right information (Default Usage Right) is present and based on the data recorded in the default usage-right information.

[7. Backup/Restoration Process]

A backup and restoration processes of the content purchased by the client or content usage-right information will now be described.

The restoration process is performed in order to re-obtain the license information corresponding to the content, that is, the service data, to re-obtain and store the usage-right information, or to re-obtain the content when or after the client purchases the content.

In one form of the restoration process, any or all of the service data, the usage-right information, and the content can be re-obtained. In the following example, a sequence of process steps for re-obtaining and storing all of the service data, the usage-right information, and the content is described, by way of example; however, all data is not necessarily re-obtained, and any of the data may be selectively re-obtained.

Figure 23:
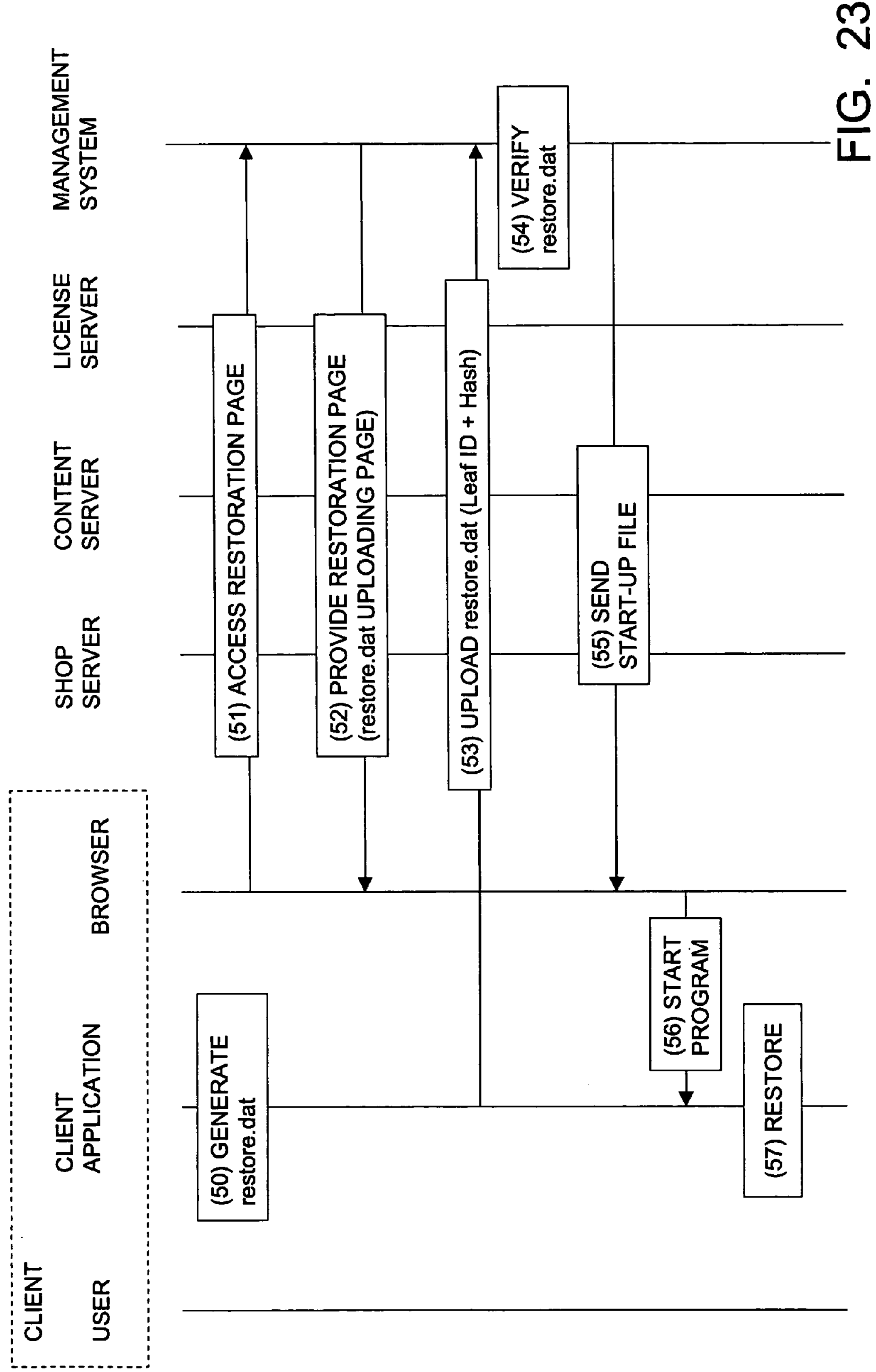
FIG. 23 is a chart showing a sequence (part 1) of operation steps performed between entities in a license or content backup/restoration process.

The details of the backup/restoration process will be described with reference to FIG. 23 and the subsequent figures. FIG. 23 shows an initial communication sequence of steps in the backup/restoration process performed between a client having a client application and a browser, such as a PC, and a shop server, a content server, a license server, and a management system. The process shown in the sequence diagram is described hereinbelow.

It is assumed that the client purchased content in an authorized manner according to the above-described content purchase process. The sequence shown in FIG. 23 is a sequence of steps subsequent to the content purchase process.

The client which purchased the content generates a data file for obtaining backup/restoration data, that is, a restoration request file [restore.dat] (step (50)). The structure of the restoration request file [restore.dat] is shown in FIG. 24.

Figure 24:
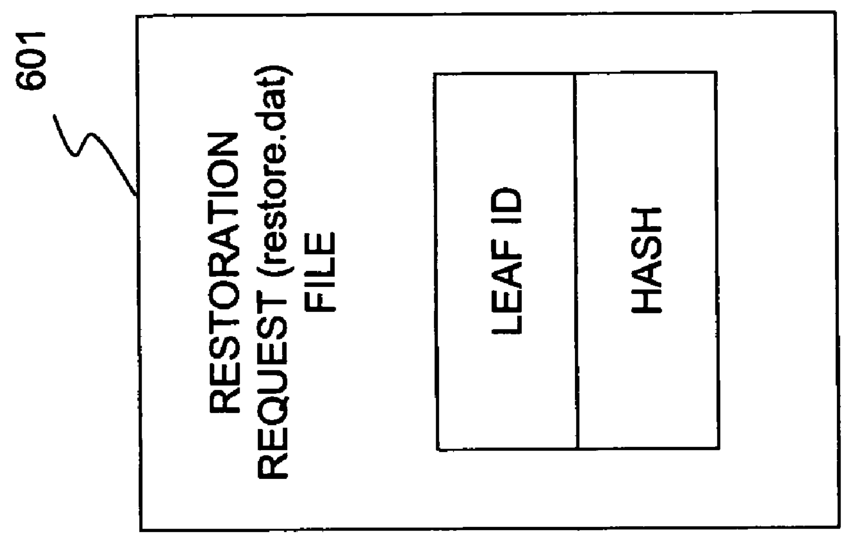
FIG. 24 is a view showing an example structure of a restoration request file [restore.dat].

As shown in FIG. 24, the restoration request file [restore.dat] is formed of a leaf ID serving as client identification data in an EKB distribution tree, and a hash value, for example, verification data having a MAC (Message Authentication Code). The client application uses a secret key shared with the management system to calculate the hash value or the MAC, which is verification data based on the leaf ID, to generate the restoration request file [restore.dat] formed of the leaf ID and the verification data.

Figure 25:
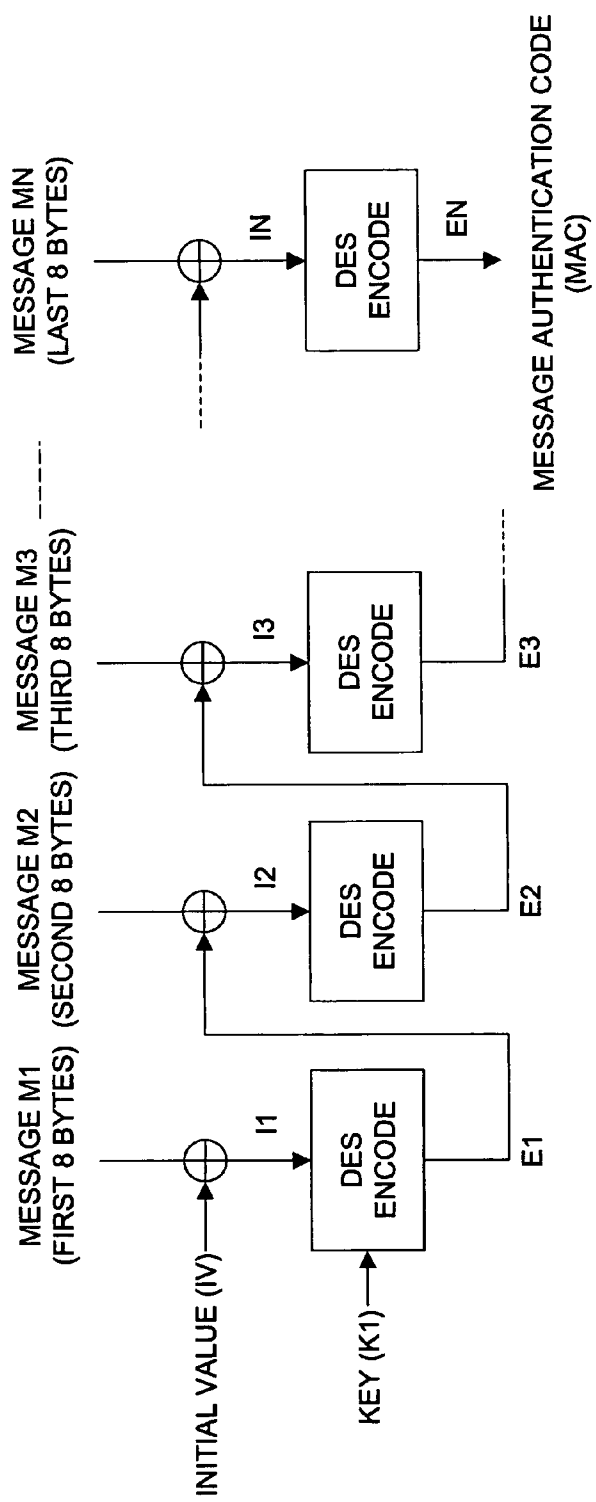
FIG. 25 is a view showing a MAC generation mechanism.

The message authentication code (MAC) is generated as data for determining whether or not the data is tampered with. An example of a process for generating a MAC value by means of DES encryption is shown in FIG. 25. As shown in FIG. 25, a message to be processed is divided into parts each consisting of eight bytes (the divided parts of the message are hereinafter denoted by M1, M2, . . . , MN). First, the exclusive-OR between an initial value (hereinafter referred to as IV) and M1 is calculated (wherein the result is indicated by I1). Then, I1 is input to a DES encoder to encrypt it using a key (hereinafter denoted by K1) (wherein the resultant output is indicated by E1). Then, the exclusive-OR between E1 and M2 is calculated, and the resultant output I2 is input to the DES encoder to encrypt it using the key K1 (the resultant output is indicated by E2). The above-described operation is repeated until all parts of the message are encrypted. The final output EN is employed as a message authentication code (MAC).

The MAC value has a different value if source data for generating the MAC changes. A MAC generated based on the data (message) to be verified is matched with the recorded MAC. If both MACs match, it is proved that the data (message) to be verified is not modified or tampered with.

Referring back to the sequence diagram shown in FIG. 23, the client accesses a restoration page provided by the management system via the browser (step (51)), and the management system provides the restoration page for the browser of the client (step (52)). The restoration page provided by the management system is a page having an uploading function of the restoration request file [restore.dat].

On the restoration page provided by the management system, the client uploads the restoration request file [restore.dat] generated by the client application (step (53)). As described above with reference to FIG. 24, the restoration request file [restore.dat] is formed of a leaf ID serving as a client identification data in an EKB distribution tree, and a hash value having, for example, a MAC (Message Authentication Code).

Upon receipt of the restoration request file [restore.dat], the management system uses a secret key shared with the client to determine a hash value for the leaf ID, and matches the determined hash value with the received hash value to verify the received data (step (54)).

On the condition that the determined hash value matches the received hash value, a start-up file for backup/restoration is sent to the client (step (55)). The start-up file has the file structure similar to that described above with reference to FIG. 15.

The start-up file is passed from the browser to the client application (step (56)) to start a backup/restoration execution program, which is determined and selected depending upon a script or an extension of the start-up file to perform a restoration process (step (57)).

The objects to be backed up/restored are service data, content, and content usage-right information. As described above, the service data can be obtained by registering the client to the license server, and the content can be obtained from the content server. The usage-right information is obtained from the license server. In the backup/restoration process, such data are also obtained from the respective servers.

Figure 26:
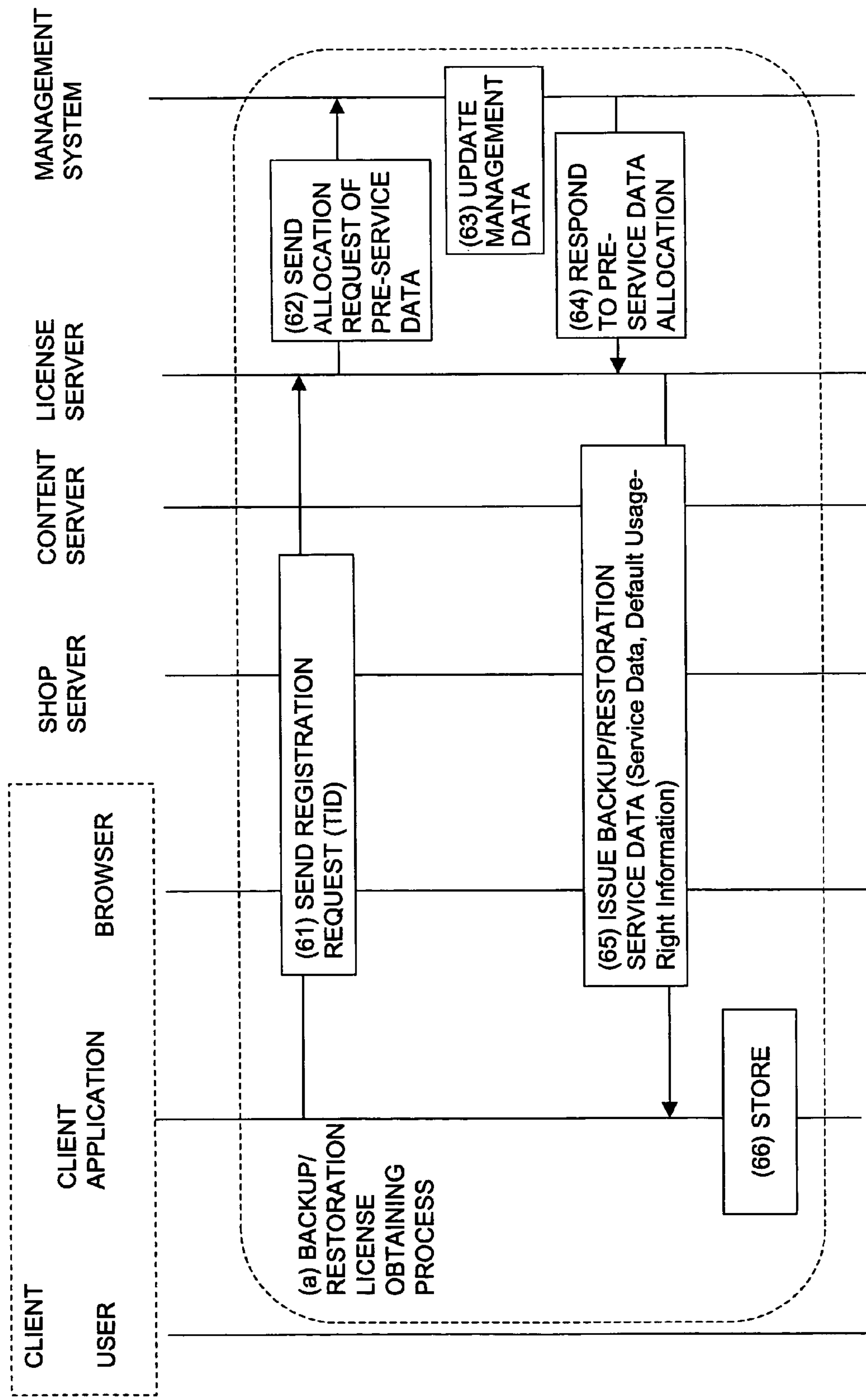
FIG. 26 is a chart showing a sequence (part 2) of operation steps performed between the entities in the license or content backup/restoration process.

A process for obtaining service data for backup/restoration is first described with reference to FIG. 26. This process is basically performed in accordance with a procedure similar to that in the above-described client registration process for content purchase.

First, the client application sends a registration request to the license server (step (61)). The registration request includes the transaction ID (TID) contained in the start-up file generated by the management system.

The license server which has received the registration request identifies the process for obtaining service data for backup/restoration based on the transaction ID (TID), and sends an allocation request of pre-service data, that is, backup/restoration data of the service data, to the management system (step (62)). The management system determines, based on management data, whether or not there is any client terminal which executed processing based on the same transaction ID. If such a client terminal exists, the management data in association with the client terminals is stored (step (63)). This can prevent processing when a limited time (for example, three times) the backup/restoration process is carried out and if a request is made in excess of the upper limit.

The management system which has updated the management data sends a response to the pre-service data allocation request to the license server (step (64)). This response is sent as permission information to issue backup/restoration service data.

The license server which has received the pre-service data allocation response issues backup/restoration service data to the client (step (65)). As described above with reference to FIG. 17(*a*), the service data 370 includes a client-unique leaf ID assigned in the EKB distribution tree, a service ID serving as a service identifier, and data E(Kroot, DNK) formed by encrypting a device node key (DNK) using a root key (Kroot).

During this operation, the default usage-right information (see FIG. 17(*b*)) is also issued to the client from the license server. As described above, standard usage-right information contains usage rules and conditions of the purchased content, and is issued when the content is purchased; whereas, the default usage-right information is not issued on the condition that the content is purchased, but is issued on the condition that the client is registered or the service data is issued. As described above, the default usage-right information is used as usage-right information for effective use in the content preview process.

The client which has received the service data and default usage-right information from the license server stores such data in a storage unit for backup (step (66)).

Figure 27:
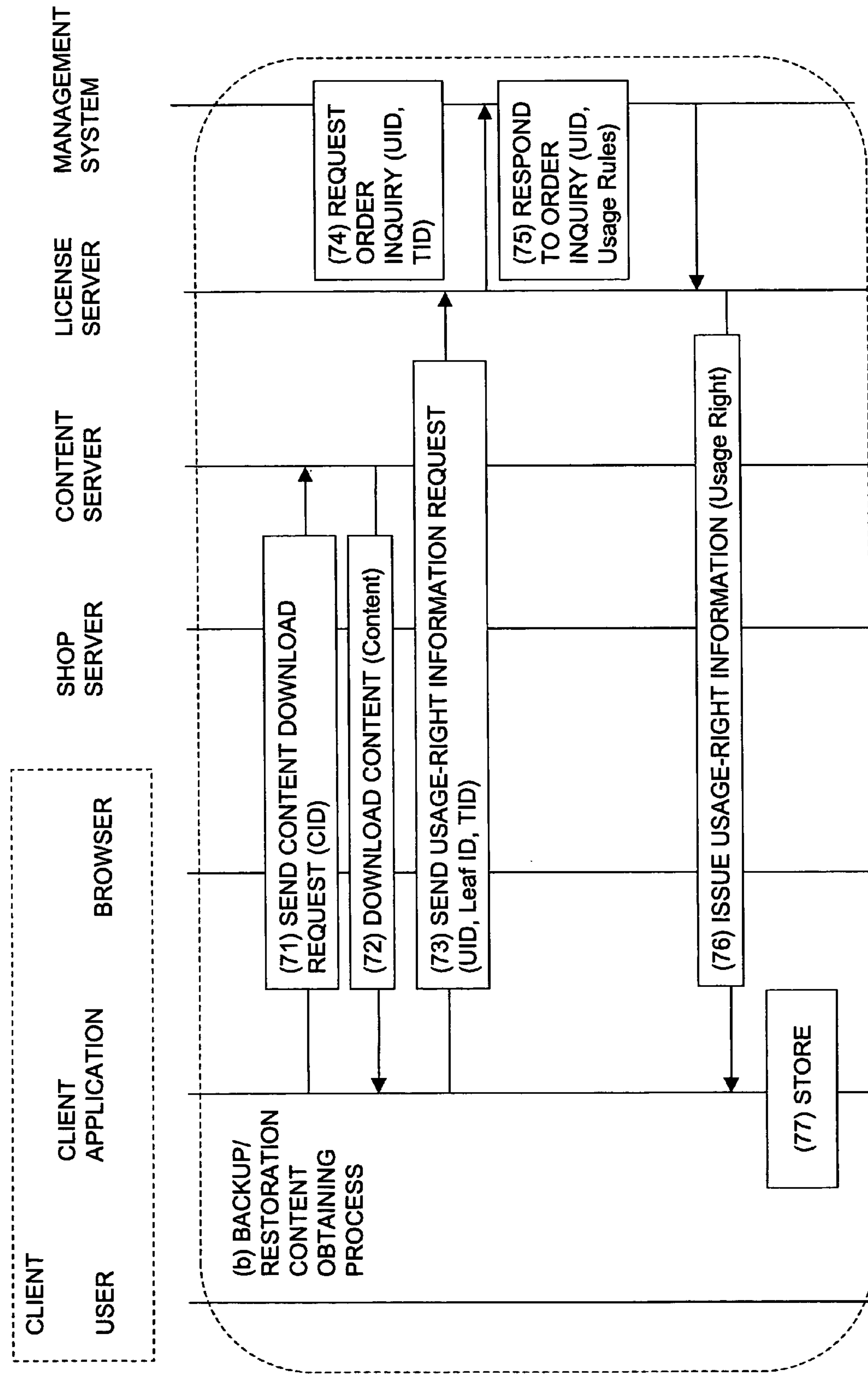
FIG. 27 is a chart showing a sequence (part 3) of operation steps performed between the entities in the license or content backup/restoration process.

The content backup/restoration process will be described with reference to FIG. 27. In the content backup/restoration process, the client application sends a content download request to the content server (step (71)). The content is the same as the content previously purchased by the client. The client application specifies content based on the content ID (CID) to send a download request of the content to the content server.

Upon receipt of the content download request, the content server sends content information corresponding to the CID to the client (step (72)). The content information is information containing the encrypted content. As described above with reference to FIG. 17(*c*), the content information is a file in which the content data Enc(Kc, Content) encrypted using a content key Kc, the data Enc(Kroot, Kc) formed by encrypting the content key Kc using a root key Kroot, the EKB for obtaining the root key Kroot, and information, such as the preview flag data and the service ID, are added.

The client which has received the content information sends a request for obtaining usage-right information (Usage Right) corresponding to the received content to the license server (step (73)). The request contains the usage-right information ID (UID) contained in the start-up file (see FIG. 15), the leaf ID serving as client identification data, and the transaction ID (TID).

Upon receipt of the usage-right information (Usage Right) obtaining request, the license server sends an order inquiry to the management system (step (74)). This request contains the usage-right information ID (UID) and the transaction ID (TID). Upon receipt of the order inquiry, the management system sends response information having the usage rules corresponding to the usage-right information ID (UID) to the license server in response to the order inquiry (step (75)).

Upon receipt of the response information, the license server generates usage-right information (Usage Right) having content usage rules, and re-issues the generated usage-right information to the client (step (76)). The content usage rules are formed of the time the content can be played back, the expiry, and permission information of various operations, such as content copying and checkout to an external device.

The client which has received the usage-right information (Usage Right) stores the previously received content and usage-right information in a storage unit as backup data.

The usage-right information issued by the license server in the backup/restoration process may contain different usage rules from those of the usage-right information issued when authorized content is purchased. Such usage rules may include, for example, more limited conditions than the usage rules contained in the usage-right information issued when authorized content is purchased, such as a limited use period, copy-prohibited, or checkout-prohibited, and the usage-right information for backup/restoration containing such usage rules may be issued.

[8. Secondary Distribution of Content Based on Recommendation File]

A mechanism in which the client which purchased content in an authorized manner provides the purchased content for another client, i.e., so-called secondary distribution of the content is performed, and a content usage right is newly delivered from the license server so that the client which has received the secondarily distributed content can also use the content on the condition that the client has the authorized content usage right, while reducing the load on the content server which distributes the content, will now be described.

As described above, the client which plays back the content for use must receive encrypted content from the content server and must also receive license information, that is, service data and usage-right information corresponding to the content, from the license server in order to use the content.

Since the license information, i.e., the service data and the usage-right information, has a small amount of data, a large amount of traffic is not generated even if such information is exchanged frequently over a communication network such as the Internet, and does not cause a problem in that it takes a long time to transfer the information. However, the content including various kinds of data, such as music data, image data, and programs, has a large amount of data. When such a large content is transmitted from a specific content server to multiple clients, various problems occur in that the transmission time is long, the load on the content server increases, a large amount of network traffic is generated, etc. There can occur another problem that a communication error causes a content distribution error during communication.

A system in which a client which purchased the authorized content provides the content for another client, i.e., secondarily distributes the content, and the client which has received the secondarily distributed content receives license information of the content from the license server, thus reducing the load on the content server which sends the content to the client is described hereinbelow.

Figure 28:
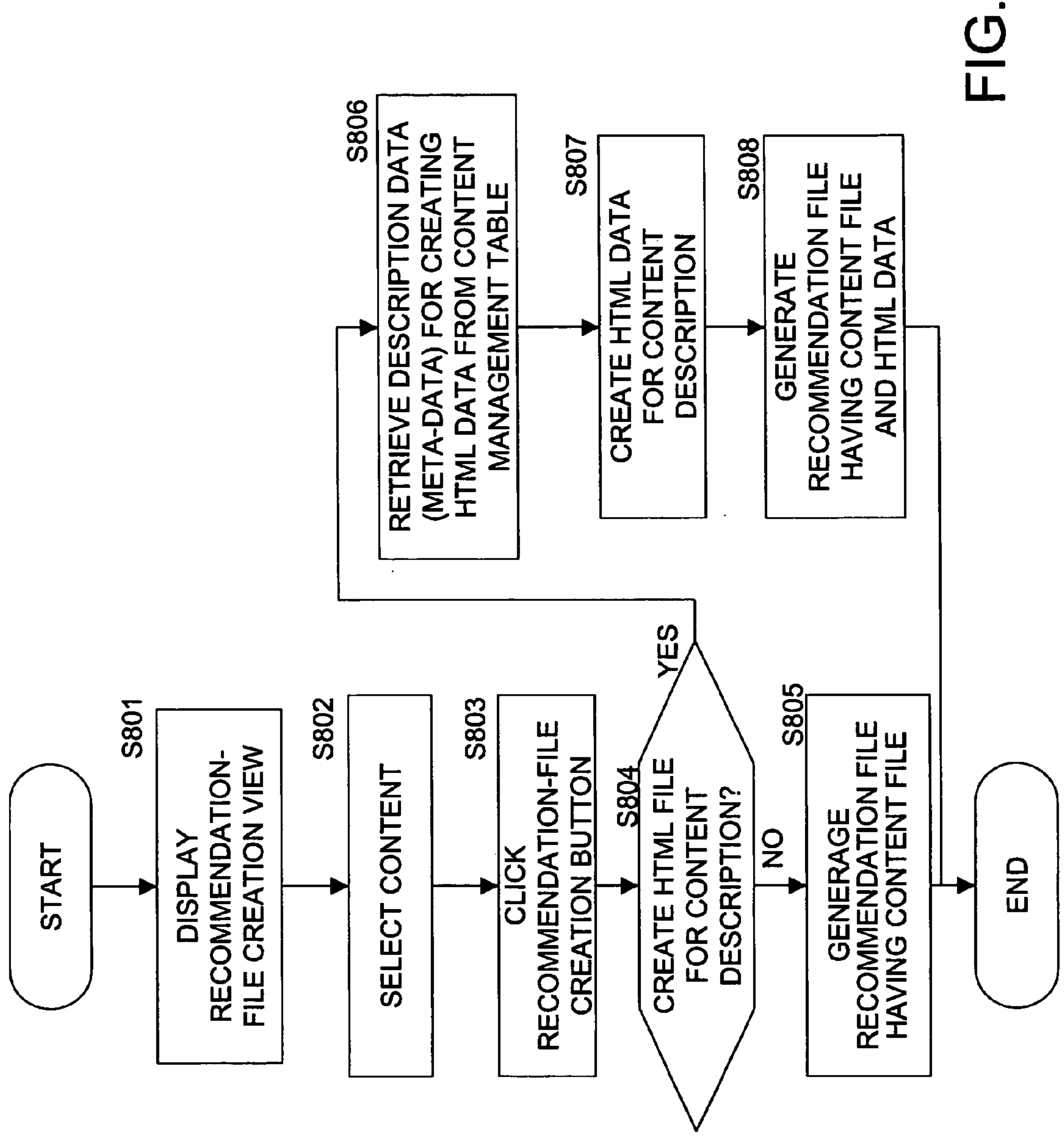
FIG. 28 is a flowchart showing a recommendation file generation process.

FIG. 28 is a flowchart showing a procedure for generating a content file provided by a client which received content in an authorized manner for another client. A data file including the content provided for another client is referred to as a recommendation file. The recommendation file contains a content file including the encrypted content, and, if necessary, a description file (for example, an HTML file) of the content.

The process shown in the flowchart of FIG. 28 is described hereinbelow. A client which performs the process shown in FIG. 28 is a client which performed the above-described content purchase process to purchase the content in an authorized manner, or a client which received the recommendation file from another client to obtain the authorized license in the subsequent procedure. The process shown in FIG. 28 is carried out by executing one execution program of the client application (the client application 12 shown in FIG. 1) under control of a controller (a CPU, etc.) of an information processing apparatus serving as a client system. In step S801, the client displays a recommendation-file creation view on a display of its client device.

Figure 29:
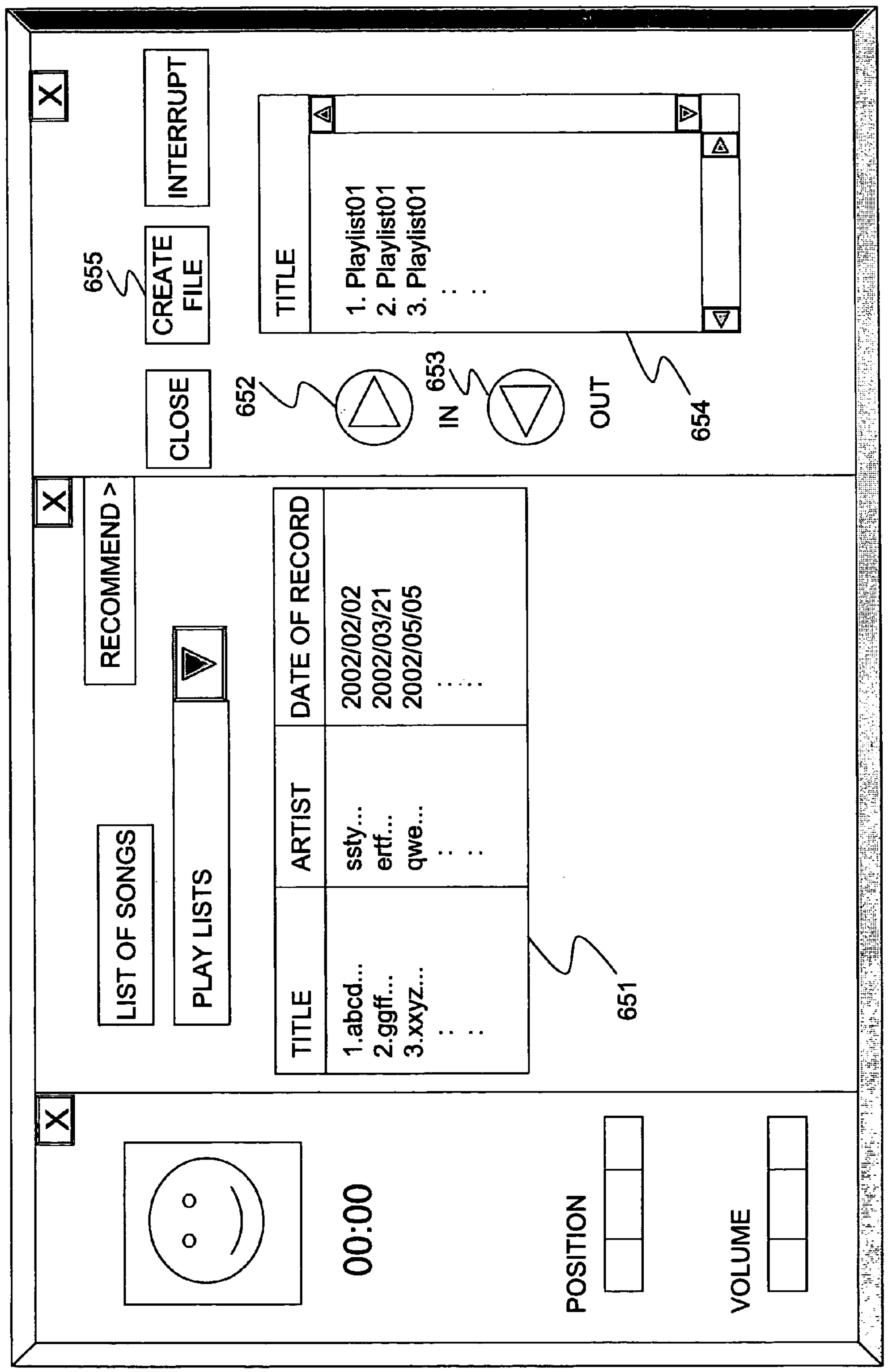
FIG. 29 is an illustration of a recommendation file generation view.

An example recommendation-file creation view is shown in FIG. 29. A content list 651 of pieces of content which were purchased in an authorized manner by the client and which can be played back is displayed in the center window. When a recommendation file is generated, a piece of content is selected from the content list 651 (step S802), and the title, etc., of the selected piece of content is shown in a list 654 displayed in the right window. Movement of the piece of content between the content list 651 and the list 654 is executed by operating drag switches 652 and 653.

When the piece of content whose recommendation file is to be generated is selected, in step S803, a recommendation-file creation button 655 is clicked. When the recommendation-file creation button 655 is clicked, it is determined in step 5804 whether or not a description file, for example, an HTML description file, is generated and stored in the recommendation file together with the content file. This is selectable by the user.

Figure 30:
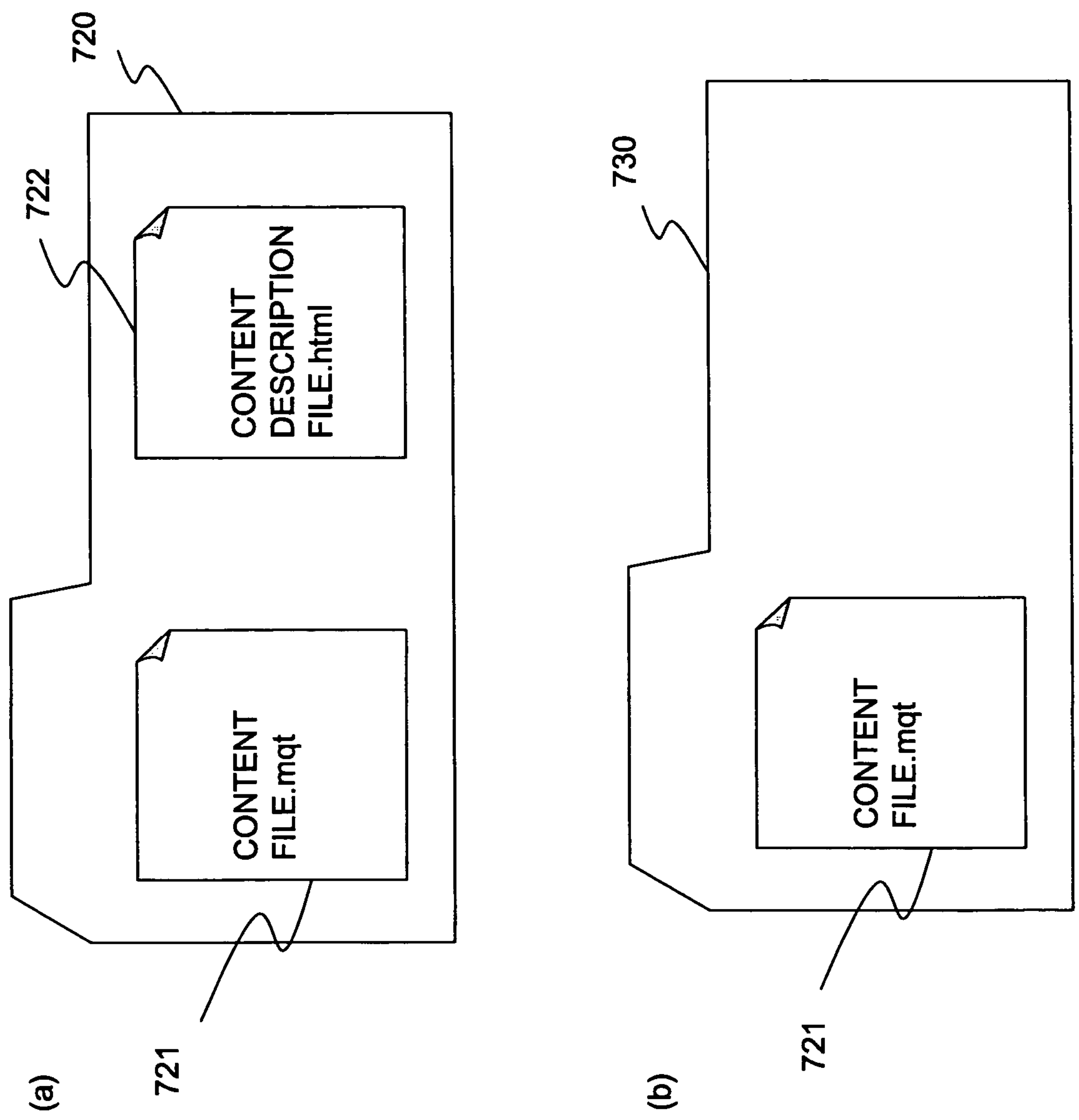
FIG. 30 is a view showing an example structure of a recommendation file.

There are two types of recommendation files; a recommendation file 720 shown in FIG. 30(*a*) has a combination of a content file 721 including the encrypted content and a content description file 722, and a recommendation file 730 shown in FIG. 30(*b*) has a content file 721 including the encrypted content alone. The client is free to select either type.

If it is determined in step S804 that a content description file is not created, the recommendation file 730 having the content file 721 alone, shown in FIG. 30(*b*), is generated.

Figure 31:
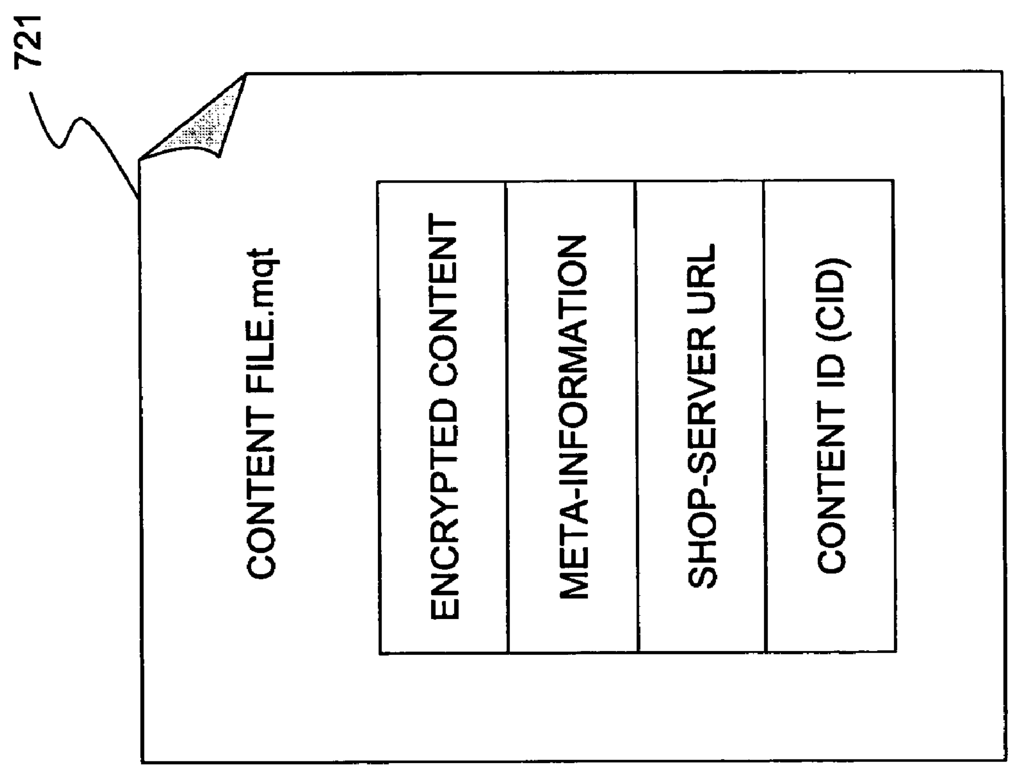
FIG. 31 is a view showing an example structure of a content file contained in the recommendation file.

The structure of the content file is shown in FIG. 31. The content file (MQT file) 721 includes the encrypted content, meta-information serving as additional content information, a shop-server URL indicating the shop from which the content can be purchased, and a content ID (CID) serving as a content identifier.

The encrypted content contained in the content file is the content encrypted using a content key Kc, and the content key Kc is a key which can be obtained only by using a key which can be obtained by decoding an enabling key block (EKB) provided using an enabling key block (EKB) distribution tree structure.

If it is determined in step S804 that a content description file is created, in step S806, description data (meta-data) for generating the content description file (HTML file) is retrieved from a content management table. Although, as described above, the content description data corresponding to the content is also contained in the content file together with the encrypted content, the client which obtained the content usage right in an authorized manner has stored and managed the content meta-data retrieved from the content fil as content management data in a separate file. The meta-data for the description file generated in the recommendation file is extracted from the content management data.

In step S807, the meta-data extracted from the content management data is added to a template HTML file set in the client application to generate an HTML file for content description. In step S808, a recommendation file having a combination of the content file and the HTML file for description is generated.

Figure 32:
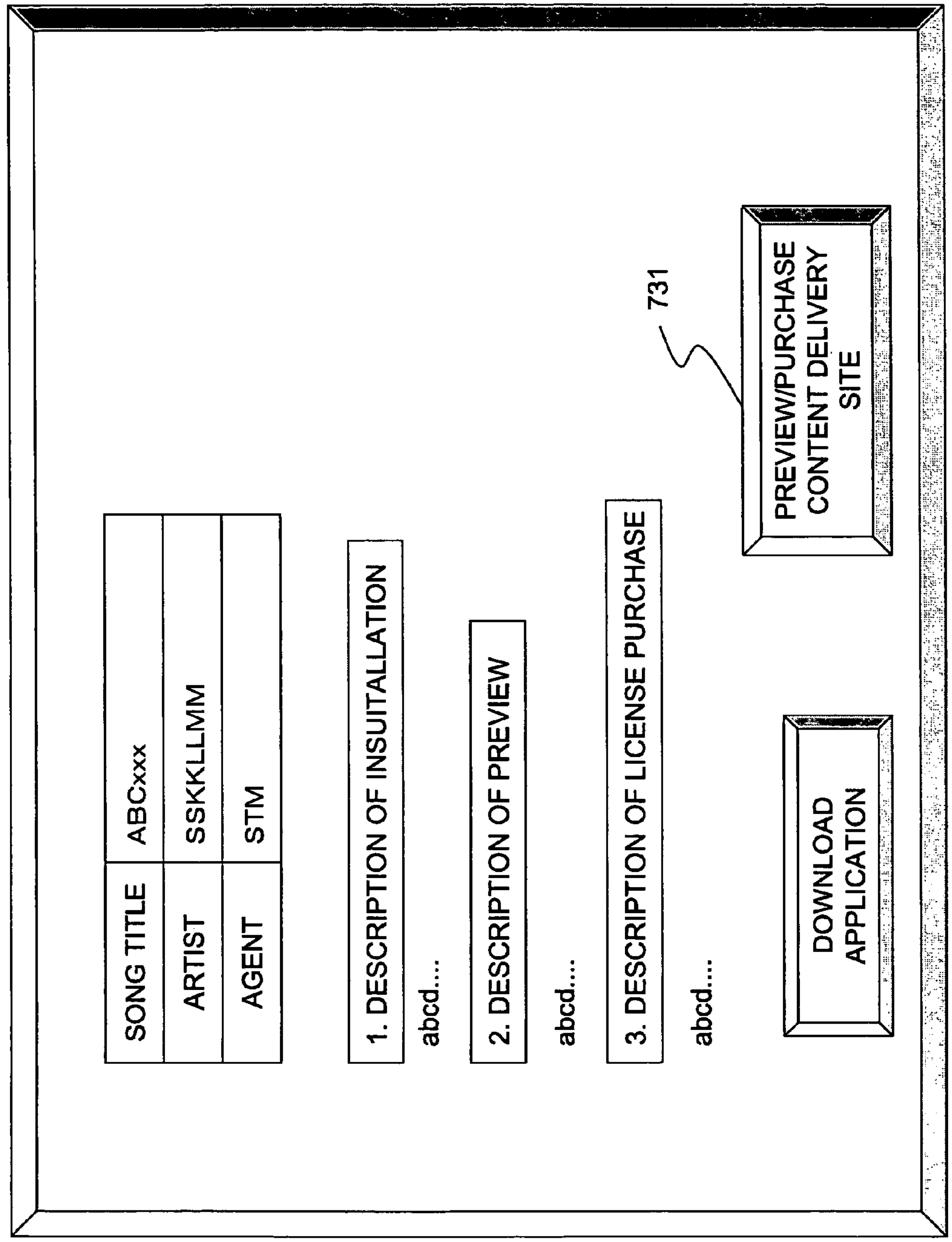
FIG. 32 is a view showing a display example of a content description file contained in the recommendation file.

An example view of the HTML file serving as a content description data is shown in FIG. 32. In the example shown in FIG. 32, the content is music data. As shown in FIG. 32, the description file includes a music content list of song titles, artists, and agents, and description of various operations and processes. The client which has received the recommendation file from another client first opens the description file.

The content contained in the recommendation file is encrypted content, and cannot be played back unless the authorized license information, i.e., the service data and the usage-right information corresponding to the content, is obtained. Therefore, the client which has received the recommendation file must execute a license information obtaining procedure in order to use the content stored in the recommendation file.

The license information obtaining process will be described with reference to the process flowcharts shown in FIGS. 33 and 34. The client which has received the recommendation file opens the description file (HTML file) shown in FIG. 32, and clicks a preview/purchase content delivery site button 731 (step S811). This clicking operation allows the client application to start (step S812) so as to retrieve the content file (MQT file) (see FIG. 31) stored in the same recommendation file to extract the content ID (CID) and the shop URL from the content file (step S813).

The preview/purchase content delivery site button 731 of the content description file is therefore formed as link data for starting a client application program for extracting the shop-server URL from the content file and outputting the extracted URL to the browser. This enables the client which has received the recommendation file to easily access the shop to perform the purchase process.

In step S814, a content file name is configured based on the content ID (CID) extracted from the content file. This file name configuration process is set in advance in the client application, in which, for example, the title of the content, the name of artist, combination data thereof, or the like is employed. In step S815, the content file having the file name configured in step S814 is stored in the storage unit of the client.

In step S816, the shop URL extracted from the content file in step S813 is transferred to the browser, and the browser reads the shop page corresponding to the received URL from the shop server.

Figure 34:
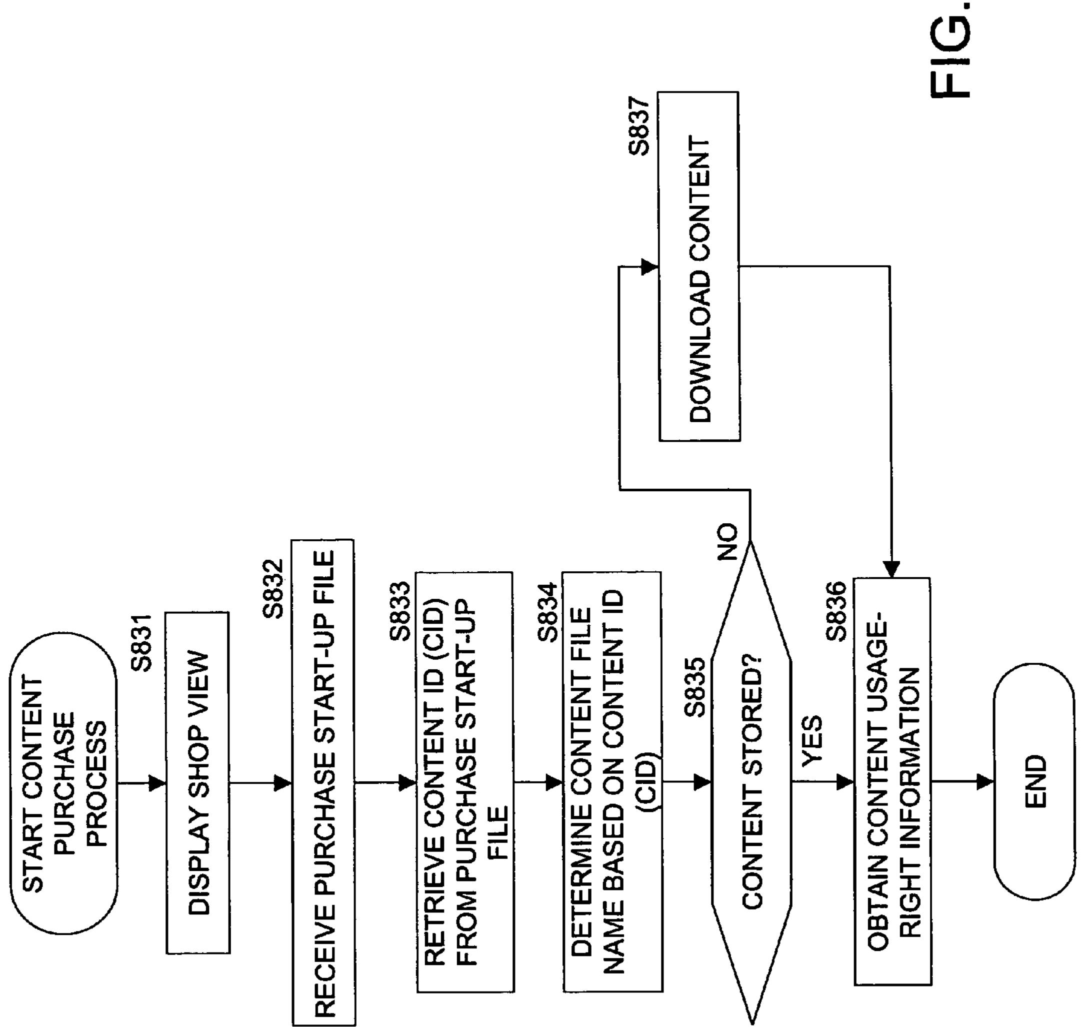
FIG. 34 is a flowchart (part 2) for the license information obtaining process of the client which has received the recommendation file.

In step S831 in the process shown in the flowchart of FIG. 34, a shop view is shown in the client display. The subsequent operations are basically similar to any of the above-described content purchase and preview processes, and are performed according to the procedure described above with reference to FIGS. 11, 13, 18, and 21. However, the content itself has been already retrieved by the client from the recommendation file, and the process for receiving the content from the content server is thus omitted.

The overview of a series of operations is shown in step S832 and the following steps of the process flowchart shown in FIG. 34. First, when the client specifies purchase in the shop view provided by the shop server and outputs a purchase request to the shop server, a purchase start-up file is sent from the shop server. The purchase start-up file has a structure similar to that of the start-up file described above with reference to FIG. 15.

In step S833, the content ID (CID) serving as a content identifier is retrieved from the start-up file. In step S834, a content file name is determined based on the content ID (CID). As described above with reference to the flowchart shown in FIG. 33, it is defined in the client application that the content file name necessary for storing the content in the client device is configured based on the content ID (CID), and the CID and the file name are associated with each other.

In step S835, it is determined whether or not the file having the same file name as the file name determined from the content ID (CID) has been stored in the storage unit of the client device. If the content has not been stored, in step S837, the client device accesses the content server to download the content. This operation is similar to that in the above-described content purchase process.

Figure 33:
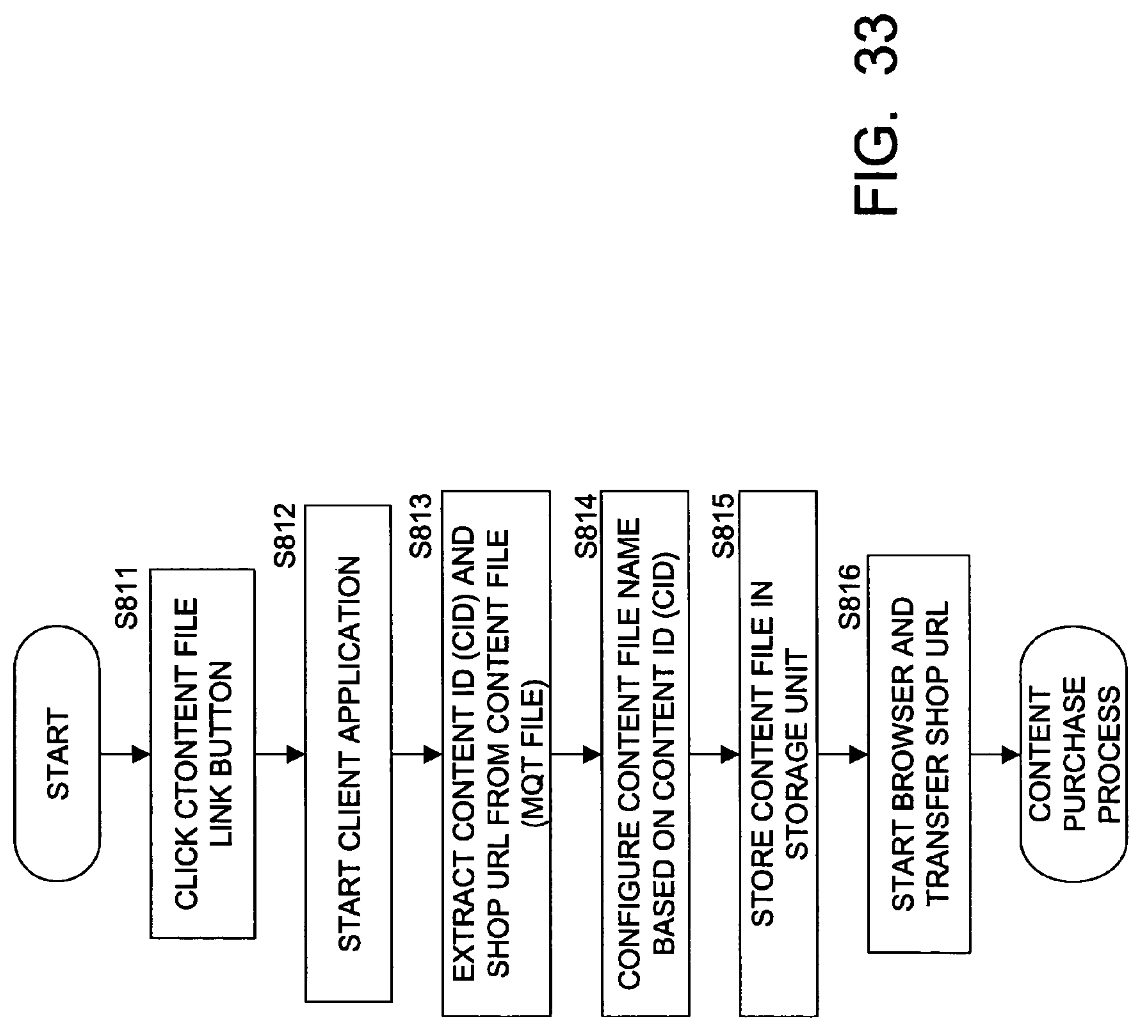
FIG. 33 is a flowchart (part 1) for a license information obtaining process of a client which has received the recommendation file.

Meanwhile, the client which received the recommendation file has stored in the storage unit the content file having the predetermined file name configured in steps S814 and S815 in the flowchart shown in FIG. 33, and the content usage-right information process is performed in step S836, without the content downloading process. Then, the process ends.

When the client plays back the content, as described above, the content identifier (CID) stored in the content usage-right information is matched with the content identifier (CID) of the content to be played back, and the content is played back on the condition that the CIDs match. The content can be played back and used by decoding an enabling key block (EKB) provided using an enabling key block (EKB) distribution tree structure to obtain a content key Kc, and by using the obtained content key Kc to decode the encrypted content.

Accordingly, the client having the content provides the recommendation file formed of the content file including the encrypted content and the description file for another client, thus allowing the other client to receive the content without access to the content delivery server. The other client is able to use the content on the condition that the usage-right information has been obtained. This prevents unauthorized use of the content.

Although the service data obtaining process is omitted in the flowchart shown in FIG. 34, when a client having no service data receives a recommendation file, the client must access the license server to perform a registration process to obtain the service data. The registration process corresponds to the process described above with reference to FIGS. 13 and 16.

The present invention has been described in detail with reference to a specific embodiment. However, it is obvious that modifications or replacements may be made to this embodiment by those skilled in the art without departing from the spirit and scope of the present invention. The present invention has been disclosed in an exemplary form, and this form should be construed as the restricted one. Reference should be made to the CLAIM for delineation of the scope of the present invention.

The series of operations described herein can be executed by hardware or software, or a combination thereof. In a case where the operations are executed by software, a program containing a sequence of the operations may be installed in an internal memory of a computer incorporated in dedicated hardware to execute the program, or the program may be installed in a general-purpose computer capable of performing various operations to execute the program.

For example, the program can be recorded in advance in a storage medium such as a hard disk or a ROM (Read Only Memory). Alternatively, the program can be temporarily or persistently stored (recorded) in a removable recording medium, such as a flexible disk, a CD-ROM (Compact Disc Read Only Memory), an MO (Magneto optical) disk, a DVD (Digital Versatile Disc), a magnetic disk, or a semiconductor memory. Such a removable recording medium can be offered as so-called packaged software.

The program may be installed in a computer from the above-noted removable recording media, or may also be wirelessly transferred to a computer from a download site or transferred to a computer via a line over a network such as a LAN (Local Area Network) or the Internet. The computer can receive the thus transferred program, and can install the program in an internal storage medium such as a hard disk.

The various operations described herein may be performed in a time-series manner according to the description, or may also be performed in parallel or independently depending upon the performance of the device that performs the operations or depending upon necessity.

INDUSTRIAL APPLICABILITY

According to the structure of the present invention, therefore, a client obtains default usage-right information (Default Usage Right) when it is registered to a license server, and is permitted to play back the content based on the default usage-right information in a content preview process without purchasing the content. Therefore, the user is able to preview and play back the content without purchasing the content. The client which is permitted to preview the content is limited to a client which has been registered to the license server to obtain the default usage-right information. This prevents preview-data from being randomly distributed.

According to the structure of the present invention, furthermore, also in the content preview process without purchasing the content, only the user having authorized DNKs for a hardware EKB [EKB(H)] serving as an EKB corresponding to a category tree established for hardware devices, which are content-using devices, and a service EKB [EKB(S)] serving as an EKB corresponding to a category tree established for content-using services can play back the content and preview the content with limited playback control.

The invention claimed is:

1. An information processing apparatus for controlling decrypting and using of encrypted content, the information processing apparatus comprising:

a hardware processor; and one or more units for:

sending a request for purchasing or previewing content, the request specifying the content based on a content ID;

receiving and storing an encrypted file containing the content;

recording a start-up file, the start-up file including identification data indicating a request for purchasing or previewing the content, and a usage-right information ID;

determining whether the identification data in the start-up file indicates execution of a purchase application, or execution of a preview application;

requesting default usage-right information and service data, the default usage-right information and the service data being obtained at a service registration time, the default usage-right information containing usage rules indicating whether the content is allowed to be previewed, and the service data containing a decryption key for decrypting the encrypted file containing the content;

permitting the content to be previewed by decrypting the encrypted file containing the content, using the decryption key and the usage rules of the default usage-right information;

requesting, upon execution of the purchase application, standard usage-right information corresponding to the content, the request including the usage-right information ID;

receiving the standard usage-right information containing usage rules and conditions for the content corresponding to the usage-right information ID of the start-up file;

permitting the content to be used by decrypting the encrypted file containing the content, using the decryption key and the standard usage-right information if the content has been purchased;

receiving, from a user, a selection of a piece of content from a list of purchased content displayed to the user;

generating a recommendation file in response to the user selected piece of content, the recommendation file storing a content file containing encrypted content corresponding to the user selected piece of content, and further storing a content description file containing metadata corresponding to the user selected piece of content together with the content file in the recommendation file; and sending the recommendation file to a client apparatus for use by the client apparatus, the client apparatus using the content description file contained in the recommendation file to access and decrypt the encrypted content stored in the content file for use of the encrypted content by the client apparatus.

2. A information processing apparatus according to claim 1, wherein the content which is permitted for use based on the default usage-right information is provided for the purpose of previewing, a determination is made whether or not the content includes a flag indicating content which can be previewed, and playback of the content is permitted according to the determination result.

3. An information processing apparatus according to claim 1, further comprising:

sending a service registration request by the one or more units; and receiving the default usage-right information sent from a license server in response to the registration request by the one or more units.

4. An information processing method executed in a first client apparatus for controlling decrypting and using of encrypted content, the information processing method comprising a control step of controlling content use based on usage-right information corresponding to the content, wherein the control step includes:

sending a request for purchasing or previewing content, the request specifying the content based on a content ID;

receiving and storing an encrypted file containing the content;

receiving a start-up file, the start-up file including identification data indicating a request for purchasing or previewing the content, and a usage-right information ID;

determining whether the identification data in the start-up file indicates execution of a purchase application, or execution of a preview application;

determining whether or not service data has been obtained, the service data containing a key for decrypting the content, and receiving service data along with default usage-right information containing usage rules if the service data was not obtained;

permitting the content to be previewed by decrypting the encrypted file containing the content, using the decryption key and the usage rules of the default usage-right information;

requesting standard usage-right information obtained upon purchasing of the content, the standard usage-right information containing usage rules and conditions for the content corresponding to the usage-right information ID of the start-up file;

permitting the content to be used by decrypting the encrypted file containing the content, using the decryption key and the standard usage-right information if the content has been purchased;

receiving, from a user, a selection of a piece of content from a list of purchased content displayed to the user;

generating a recommendation file in response to the user selected piece of content, the recommendation file storing a content file containing encrypted content corresponding to the user selected piece of content, and further storing a content description file containing metadata corresponding to the user selected piece of content together with the content file in the recommendation file; and sending the recommendation file to a second client apparatus for use by the second client apparatus, the second client apparatus using the content description file contained in the recommendation file to access and decrypt the encrypted content stored in the content file for use of the encrypted content by the second client apparatus.

5. An information processing method according to claim 4, wherein the content which is permitted for use based on the default usage-right information is provided for the purpose of previewing, and the control step further includes determining whether or not the content includes a flag indicating content which can be previewed, and permitting playback of the content according to a determination result.

6. An information processing method according to claim 4, further comprising:

sending a service registration request; and receiving the default usage-right information sent from a license server in response to the registration request.

7. A non-transitory computer storage medium storing a program which, when executed by a first client apparatus, performs a method of decrypting and using of encrypted content, the method comprising a control step of controlling content use based on usage-right information corresponding to the content according to an instruction to use the content, wherein the control step includes:

sending a request for purchasing or previewing content, the request specifying the content based on a content ID;

receiving and storing an encrypted file containing the content;

receiving a start-up file, the start-up file including identification data indicating a request for purchasing or previewing the content, and a usage-right information ID;

determining whether the identification data in the start-up file indicates execution of a purchase application, or execution of a preview application;

determining whether or not service data has been obtained, the service data containing a key for decoding the content, and receiving service data along with default usage-right information containing usage rules if the service data was not obtained;

permitting the content to be previewed by decrypting the encrypted file containing the content, using the decryption key and the usage rules of the default usage-right information;

requesting standard usage-right information obtained upon purchasing of the content, the standard usage-right information containing usage rules and conditions for the content corresponding to the usage-right information ID of the start-up file;

permitting the content to be used by decrypting the encrypted file containing the content, using the decryption key and the standard usage-right information if the content has been purchased;

receiving, from a user, a selection of a piece of content from a list of purchased content displayed to the user;

generating a recommendation file in response to the user selected piece of content, the recommendation file storing a content file containing encrypted content corresponding to the user selected piece of content, and further storing a content description file containing metadata corresponding to the user selected piece of content together with the content file in the recommendation file; and sending the recommendation file to a second client apparatus for use by the second client apparatus, the second client apparatus using the content description file contained in the recommendation file to access and decrypt the encrypted content stored in the content file for use of the encrypted content by the second client apparatus.

8. A computer storage medium according to claim 7, wherein the content which is permitted for use based on the default usage-right information is provided for the purpose of previewing, and the control step further includes determining whether or not the content includes a flag indicating content which can be previewed, and permitting playback of the content according to a determination result.

9. A computer storage medium according to claim 7, wherein the method further includes:

sending a service registration request; and receiving the default usage-right information sent from a license server in response to the registration request.

10. A content usage management system including first and second client apparatuses for decrypting and using content, and a usage-right issuing apparatus for issuing usage rights having usage rules of the content, the first client apparatus comprising:

a hardware processor; and one or more units for:

sending a request for purchasing or previewing content, the request specifying the content based on a content ID;

receiving and storing an encrypted file containing the content;

recording a start-up file, the start-up file including identification data indicating a request for purchasing or previewing the content, and a usage-right information ID;

determining whether the identification data in the start-up file indicates execution of a purchase application, or execution of a preview application;

sending a service registration request;

receiving default usage-right information and service data sent from the usage-right issuing apparatus in response to the registration request, the default usage-right information containing usage rules indicating whether the content is allowed to be previewed, and the service data containing a decryption key for decrypting the encrypted file containing the content;

permitting the content to be previewed by decrypting the encrypted file containing the content, using the decryption key and the usage rules of the default usage-right information;

requesting, upon execution of the purchase application, standard usage-right information corresponding to the content, the request including the usage-right information ID;

receiving, from the usage-right issuing apparatus, standard usage-right information containing usage rules and conditions for the content corresponding to the usage-right information ID;

permitting the content to be used by decrypting the encrypted file containing the content, using the decryption key and the standard usage-right information if the content has been purchased;

receiving, from a user, a selection of a piece of content from a list of purchased content displayed to the user;

generating a recommendation file in response to the user selected piece of content, the recommendation file storing a content file containing encrypted content corresponding to the user selected piece of content, and further storing a content description file containing metadata corresponding to the user selected piece of content together with the content file in the recommendation file; and sending the recommendation file to the second client apparatus for use by the second client apparatus, the second client apparatus using the content description file contained in the recommendation file to access and decrypt the encrypted content stored in the content file for use of the encrypted content by the second client apparatus.

* * * * *